US012500993B2

(12) United States Patent
Yamanishi et al.

(10) Patent No.: US 12,500,993 B2
(45) Date of Patent: Dec. 16, 2025

(54) INFORMATION PROCESSING DEVICE, VIDEO PROCESSING METHOD, AND PROGRAM

(71) Applicant: Sony Group Corporation, Tokyo (JP)

(72) Inventors: Takashi Yamanishi, Tokyo (JP); Junichi Tanaka, Tokyo (JP); Kohta Horiuchi, Saitama (JP); Takuma Domae, Tokyo (JP); Yasushi Minoya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 14 days.

(21) Appl. No.: 18/290,593

(22) PCT Filed: Mar. 11, 2022

(86) PCT No.: PCT/JP2022/010993
§ 371 (c)(1),
(2) Date: Jan. 19, 2024

(87) PCT Pub. No.: WO2023/007817
PCT Pub. Date: Feb. 2, 2023

(65) Prior Publication Data
US 2024/0259518 A1  Aug. 1, 2024

(30) Foreign Application Priority Data

Jul. 26, 2021 (JP) ................. 2021-121640

(51) Int. Cl.
G06T 15/00    (2011.01)
H04N 5/272   (2006.01)
G11B 27/00   (2006.01)

(52) U.S. Cl.
CPC ............. *H04N 5/272* (2013.01); *G06T 15/00* (2013.01)

(58) Field of Classification Search
CPC . G06T 15/00; G06T 2207/20221; G06T 5/50; G11B 27/031; G11B 27/00; H04N 5/222; H04N 5/2226; H04N 5/272; H04N 5/00; H04N 13/00; H04N 23/00
USPC ................................ 348/42, 61, 51, 50, 169
See application file for complete search history.

(56) References Cited

U.S. PATENT DOCUMENTS

| 6,335,765 | B1 | 1/2002 | Daly et al. |
| 7,250,945 | B1 | 7/2007 | Scaman et al. |
| 9,589,595 | B2* | 3/2017 | Gao ........................ G06T 7/75 |
| 10,079,995 | B1* | 9/2018 | Ahnoff .................. H04L 65/403 |
| 2016/0343166 | A1 | 11/2016 | Inoko |
| 2019/0138803 | A1* | 5/2019 | Okada .................. G06V 40/103 |

(Continued)

FOREIGN PATENT DOCUMENTS

| JP | 2003-298937 A | 10/2003 |
| JP | 2009-141727 A | 6/2009 |
| JP | 2009-224832 A | 10/2009 |

*Primary Examiner* — Daquan Zhao
(74) *Attorney, Agent, or Firm* — Paratus Law Group, PLLC

(57) ABSTRACT

An information processing device includes a video processing unit that generates a synthesized video by synthesizing an object video and a second video obtained by rendering second 3D background data, the object video being cut out from a captured video obtained by imaging an object with a display device as a background, the display device displaying a first video obtained by rendering first 3D background data.

20 Claims, 19 Drawing Sheets

(56) References Cited

U.S. PATENT DOCUMENTS

| | | |
|---|---|---|
| 2020/0145644 A1 | 5/2020 | Cordes et al. |
| 2022/0078038 A1* | 3/2022 | Dandapani .......... H04L 12/1827 |
| 2022/0245778 A1* | 8/2022 | Deng ........................ G06T 5/70 |
| 2024/0054739 A1* | 2/2024 | Fujita ................... H04N 13/117 |

* cited by examiner

FIG. 11
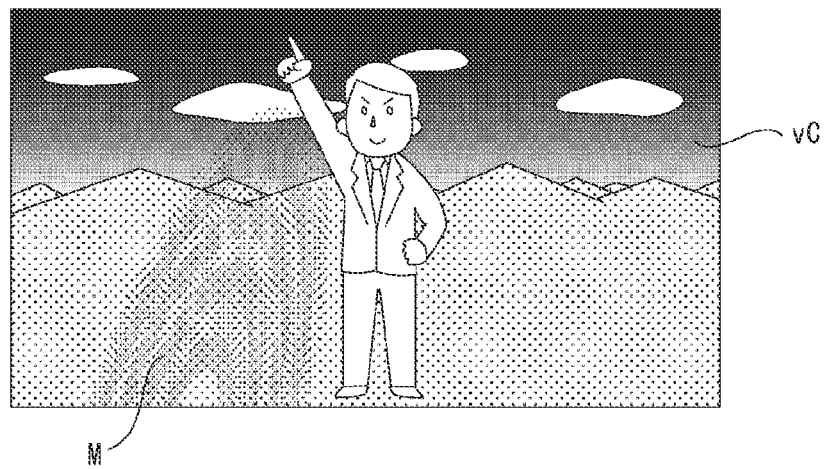
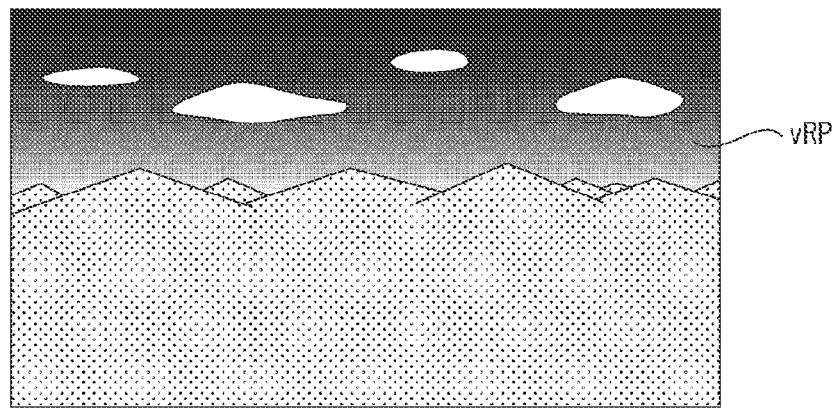

FIG. 12
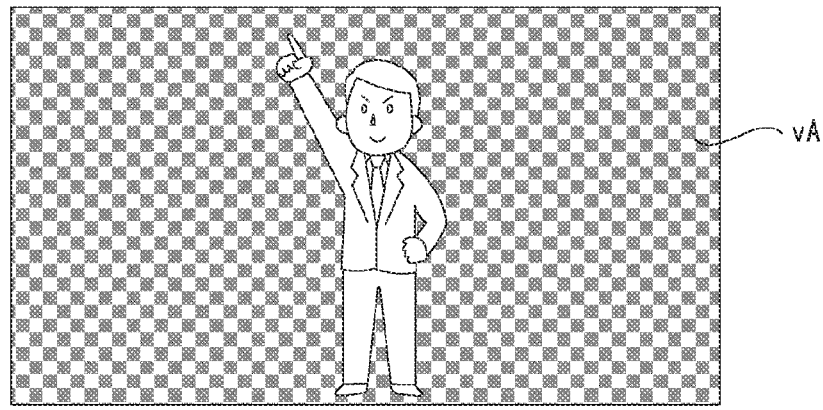
A
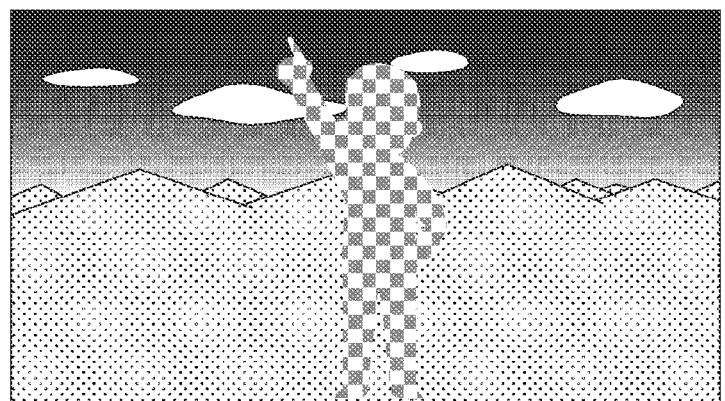
B
$(1-\alpha) \cdot vRP$
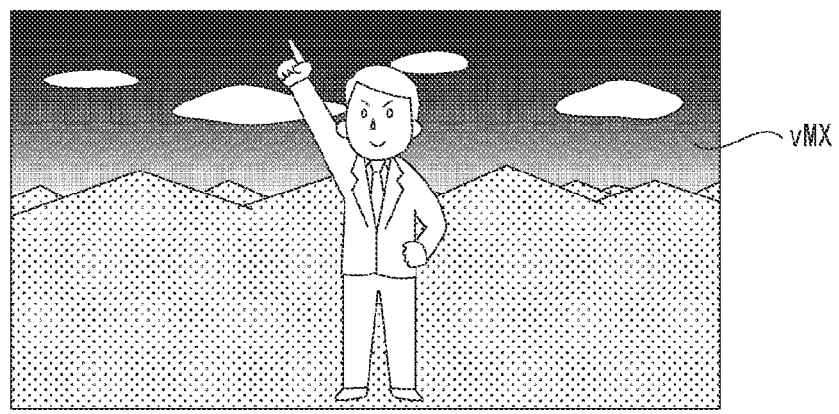
C
$vA + (1-\alpha) \cdot vRP$

INFORMATION PROCESSING DEVICE, VIDEO PROCESSING METHOD, AND PROGRAM

CROSS REFERENCE TO PRIOR APPLICATION

This application is a National Stage Patent Application of PCT International Patent Application No. PCT/JP2022/010993 (filed on Mar. 11, 2022) under 35 U.S.C. § 371, which claims priority to Japanese Patent Application No. 2021-121640 (filed on Jul. 26, 2021), which are all hereby incorporated by reference in their entirety.

TECHNICAL FIELD

The present technology relates to an information processing device, a video processing method, and a program, and particularly relates to a technology for video processing.

BACKGROUND ART

As an imaging method for producing video content such as a movie, a technique is known in which a performer performs acting with what is called a green back and then a background video is synthesized.

Furthermore, in recent years, instead of green back shooting, an imaging system has been developed in which a background video is displayed on a display device in a studio provided with a large display device, and a performer performs in front of the background video, to thereby enable imaging of the performer and the background can be imaged, and this imaging system is known as what is called a virtual production, in-camera VFX, or LED wall virtual production.

Patent Document 1 below discloses a technology of a system that images a performer acting in front of a background video.

CITATION LIST

Patent Document

Patent Document 1: US Patent Application Publication No. 2020/0145644 A

SUMMARY OF THE INVENTION

Problems to be Solved by the Invention

The background video is displayed on a large display device, and then the performer and the background video are captured with a camera, so that there is no need to prepare a background video to be separately synthesized, and the performer and staffs can visually understand the scene and determine the performance and whether the performance is good or bad, or the like, which are more advantageous than green back shooting. However, by further capturing the displayed background video by the camera, various artifacts, that is, unintended effects on a video, such as distortion and noise, occur in the captured video, such as moire in the background video portion.

Therefore, the present disclosure proposes a technology for eliminating artifacts occurring in a captured video in a system that displays a background video and performs imaging.

Solutions to Problems

An information processing device according to the present technology includes a video processing unit that generates a synthesized video by synthesizing an object video and a second video obtained by rendering second 3D background data, the object video being cut out from a captured video obtained by imaging an object with a display device as a background, the display device displaying a first video obtained by rendering first three-dimensional (3D) background data.

The first video is, for example, a background video displayed as a background at the time of imaging. The second video is, for example, a background video having the same background content as the first video. The first video and the second video may have the same video data, or may have different data quality or different viewpoint positions. The captured video is a video obtained by imaging the first video as a background and an object.

The object video is cut out from the captured video and synthesized with the second video. This means that a portion in which a defect has occurred on a video due to capturing of the first video is replaced with the second video that is not through capturing.

BRIEF DESCRIPTION OF DRAWINGS

FIG. 11 is an explanatory diagram of mask creation for substitution and synthesis of a background video of the embodiment.

FIG. 12 is an explanatory diagram of substitution and synthesis of a background video of the embodiment.

MODE FOR CARRYING OUT THE INVENTION

Hereinafter, embodiments will be described in the following order.
<1. Imaging system and content production>
<2. Configuration of information processing device>
<3. Substitution of background video>
<4. First processing example>
<5. Second processing example>
<6. Third processing example>
<7. Fourth processing example>
<8. Application example in case of using plurality of cameras>
<9. Summary and modification examples>

Note that, in the present disclosure, "video" or "image" includes both a still image and a moving image. In addition, "video" refers not only to a state in which video data is displayed on the display, but also to video data in a state in which video data is not displayed on the display.

1. Imaging System and Video Content Production

An imaging system to which the technology of the present disclosure can be applied and production of video content will be described.

Figure 1:
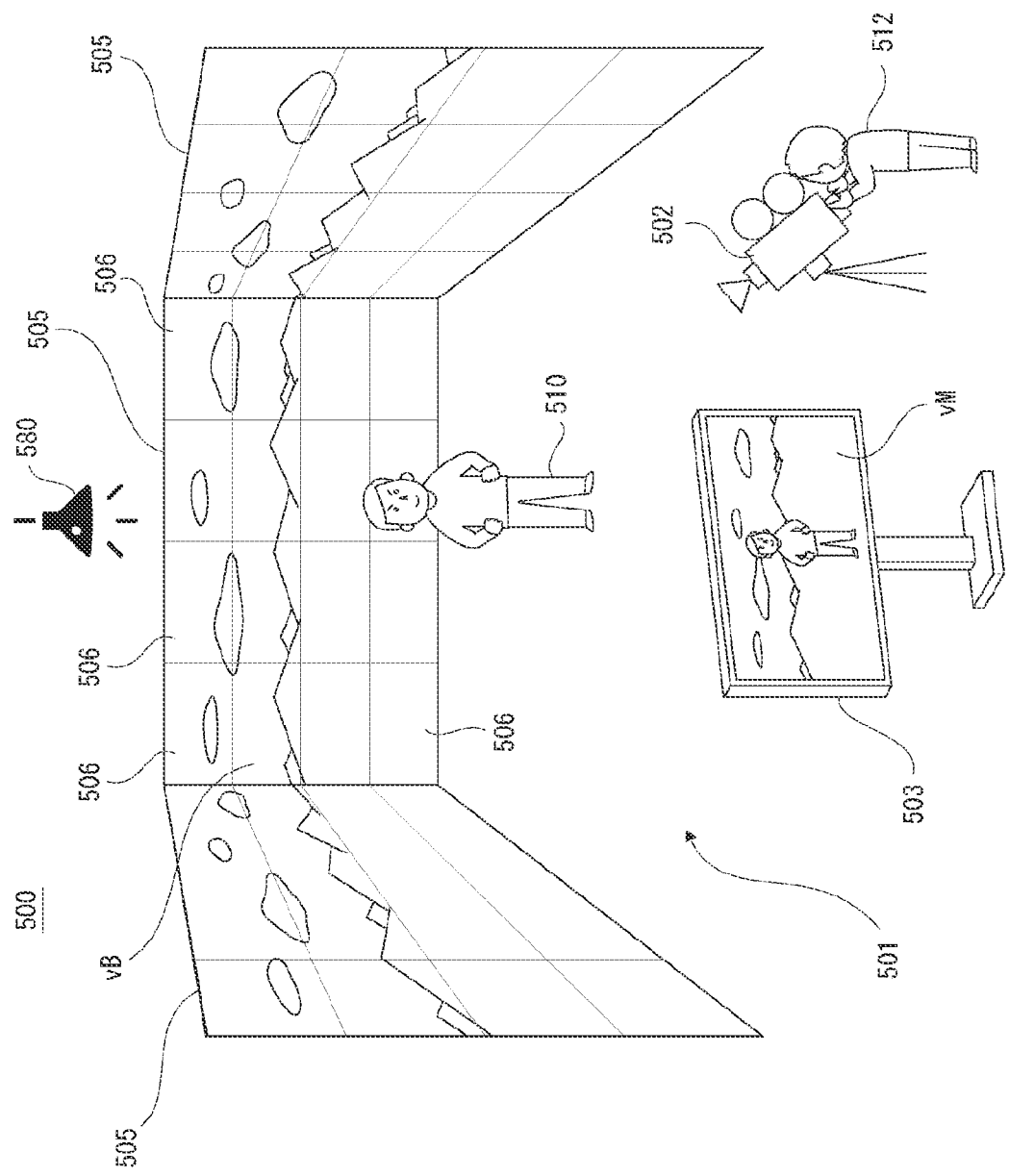
FIG. 1 is an explanatory diagram of an imaging system of an embodiment of the present technology.

FIG. 1 schematically illustrates an imaging system 500. The imaging system 500 is a system that performs imaging as virtual production, and a part of equipment disposed in an imaging studio is illustrated in the drawing.

In the imaging studio, a performance area 501 in which a performer 510 performs performance such as acting is provided. A large display device is disposed on at least a back surface, left and right side surfaces, and an upper surface of the performance area 501. Although the device type of the display device is not limited, the drawing illustrates an example in which an LED wall 505 is used as an example of a large display device.

One LED wall 505 forms a large panel by vertically and horizontally connecting and disposing a plurality of LED panels 506. The size of the LED wall 505 is not particularly limited, but is only necessary to be a size that is necessary or sufficient as a size for displaying the background when the performer 510 is imaged.

A necessary number of lights 580 are disposed at necessary positions such as above or on the side of the performance area 501 to illuminate the performance area 501.

In the vicinity of the performance area 501, for example, a camera 502 for imaging a movie or other video content is disposed. The camera operator 512 can move the position of the camera 502, and can perform an operation of an imaging direction, an angle of view, or the like. Of course, it is also conceivable that movement, angle of view operation, or the like of the camera 502 is performed by remote control. Furthermore, the camera 502 may automatically or autonomously move or change the angle of view. For this reason, the camera 502 may be mounted on a camera platform or a mobile body.

The camera 502 collectively captures the performer 510 in the performance area 501 and the video displayed on the LED wall 505. For example, by displaying a scene as a background video vB on the LED wall 505, it is possible to capture a video similar to that in a case where the performer 510 actually exists and performs at the place of the scene.

An output monitor 503 is disposed near the performance area 501. The video captured by the camera 502 is displayed on the output monitor 503 in real time as a monitor video vM. Thus, a director and a staff who produce video content can confirm the captured video.

As described above, the imaging system 500 that images the performance of the performer 510 in the background of the LED wall 505 in the imaging studio has various advantages as compared with the green back shooting.

For example, in a case of the green back shooting, it is difficult for the performer to imagine the background and the situation of the scene, which may affect the performance. On the other hand, by displaying the background video vB, the performer 510 can easily perform, and the quality of performance is improved. Furthermore, it is easy for the director and other staff members to determine whether or not the performance of the performer 510 matches the background or the situation of the scene.

Furthermore, post-production after imaging is more efficient than in the case of the green back shooting. This is because what is called a chroma key composition may be unnecessary or color correction or reflection composition may be unnecessary. Furthermore, even in a case where the chroma key composition is required at the time of imaging, the background screen does not need to be added, which is also helpful to improve efficiency.

In the case of the green back shooting, the color of green increases on the performer's body, dress, and objects, and thus correction thereof is necessary. Furthermore, in the case of the green back shooting, in a case where there is an object in which a surrounding scene is reflected, such as glass, a mirror, or a snowdome, it is necessary to generate and synthesize an image of the reflection, but this is troublesome work.

On the other hand, in a case of imaging by the imaging system 500 in FIG. 1, the hue of the green does not increase, and thus the correction is unnecessary. In addition, by displaying the background video vB, the reflection on the actual article such as glass is naturally obtained and captured, and thus, it is also unnecessary to synthesize the reflection video.

Here, the background video vB will be described with reference to FIGS. 2 and 3. Even if the background video vB is displayed on the LED wall 505 and captured together with the performer 510, the background of the captured video becomes unnatural only by simply displaying the background video vB. This is because a background that is three-dimensional and has depth is actually used as the background video vB in a planar manner.

For example, the camera 502 can capture the performer 510 in the performance area 501 from various directions, and can also perform a zoom operation. The performer 510 also does not stop at one place. Then, the actual appearance of the background of the performer 510 should change according to the position, the imaging direction, the angle of view, and the like of the camera 502, but such a change cannot be obtained in the background video vB as the planar video. Accordingly, the background video vB is changed so that the background is similar to the actual appearance including a parallax.

Figure 2:
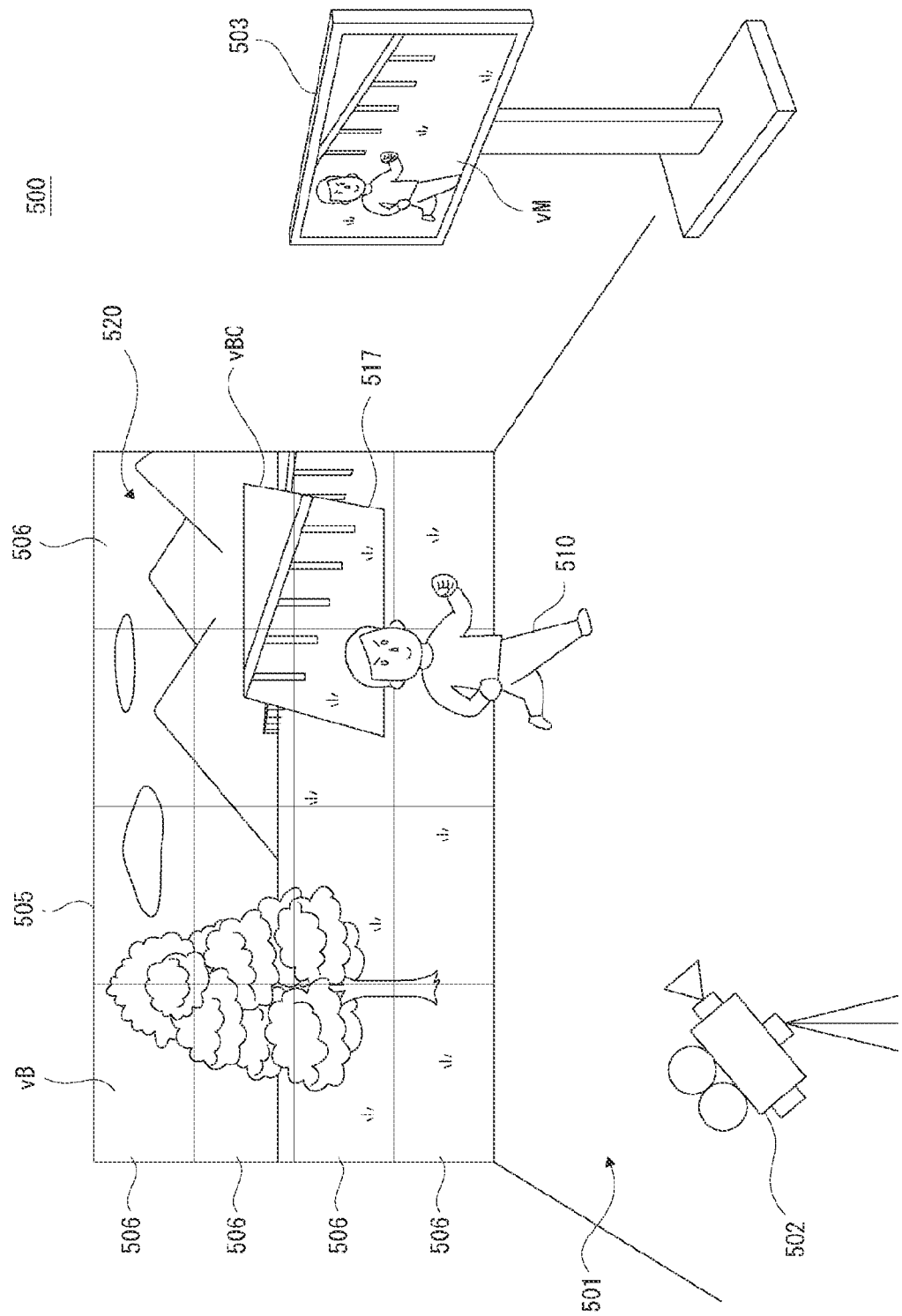
FIG. 2 is an explanatory diagram of a background video according to a camera position of the imaging system of the embodiment.
Figure 3:
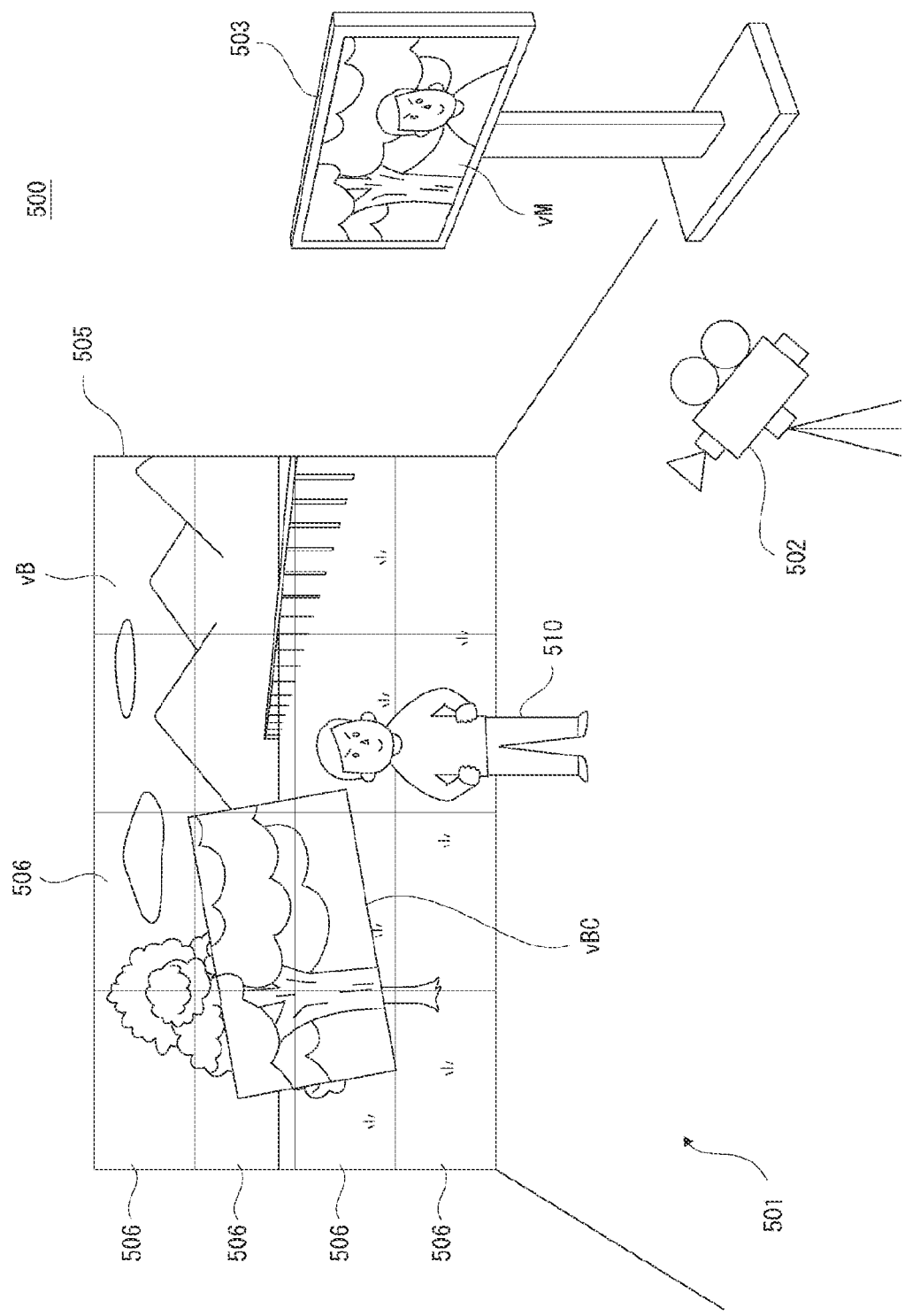
FIG. 3 is an explanatory diagram of a background video according to a camera position of the imaging system of the embodiment.

FIG. 2 illustrates a state in which the camera 502 is imaging the performer 510 from a position on the left side of the drawing, and FIG. 3 illustrates a state in which the camera 502 is imaging the performer 510 from a position on the right side of the drawing. In each drawing, a capturing region video vBC is illustrated in the background video vB.

Note that a portion of the background video vB excluding the capturing region video vBC is referred to as an "outer frustum", and the capturing region video vBC is referred to as an "inner frustum".

The background video vB described here indicates the entire video displayed as the background including the capturing region video vBC (inner frustum).

The range of the capturing region video vBC (inner frustum) corresponds to a range actually imaged by the camera 502 in the display surface of the LED wall 505. Then, the capturing region video vBC is a video that is transformed so as to express a scene that is actually viewed when the position of the camera 502 is set as a viewpoint according to the position, the imaging direction, the angle of view, and the like of the camera 502.

Specifically, 3D background data that is a 3D (three dimensions) model as a background is prepared, and the capturing region video vBC is sequentially rendered on the basis of the viewpoint position of the camera 502 with respect to the 3D background data in real time.

Note that the range of the capturing region video vBC is actually a range slightly wider than the range imaged by the camera 502 at that time. This is to prevent the video of the outer frustum from being reflected due to a drawing delay and to avoid the influence of the diffracted light from the video of the outer frustum when the range of imaging is slightly changed by panning, tilting, zooming, or the like of the camera 502.

The video of the capturing region video vBC rendered in real time in this manner is synthesized with the video of the outer frustum. The video of the outer frustum used in the background video vB is rendered in advance on the basis of the 3D background data, and the video is incorporated as the capturing region video vBC rendered in real time into a part of the video of the outer frustum to generate the entire background video vB.

Thus, even when the camera 502 is moved back and forth, or left and right, or a zoom operation is performed, the background of the range imaged together with the performer 510 is imaged as a video corresponding to the viewpoint position change accompanying the actual movement of the camera 502.

As illustrated in FIGS. 2 and 3, the monitor video vM including the performer 510 and the background is displayed on the output monitor 503, and this is the captured video. The background of the monitor video vM is the capturing region video vBC. That is, the background included in the captured video is a real-time rendered video.

As described above, in the imaging system 500 of the embodiment, the background video vB including the capturing region video vBC is changed in real time so that not only the background video vB is simply displayed in a planar manner but also a video similar to that in a case of actually imaging on location can be captured.

Note that the processing load of the system is also reduced by rendering only the capturing region video vBC as a range reflected by the camera 502 in real time instead of the entire background video vB displayed on the LED wall 505.

Figure 4:
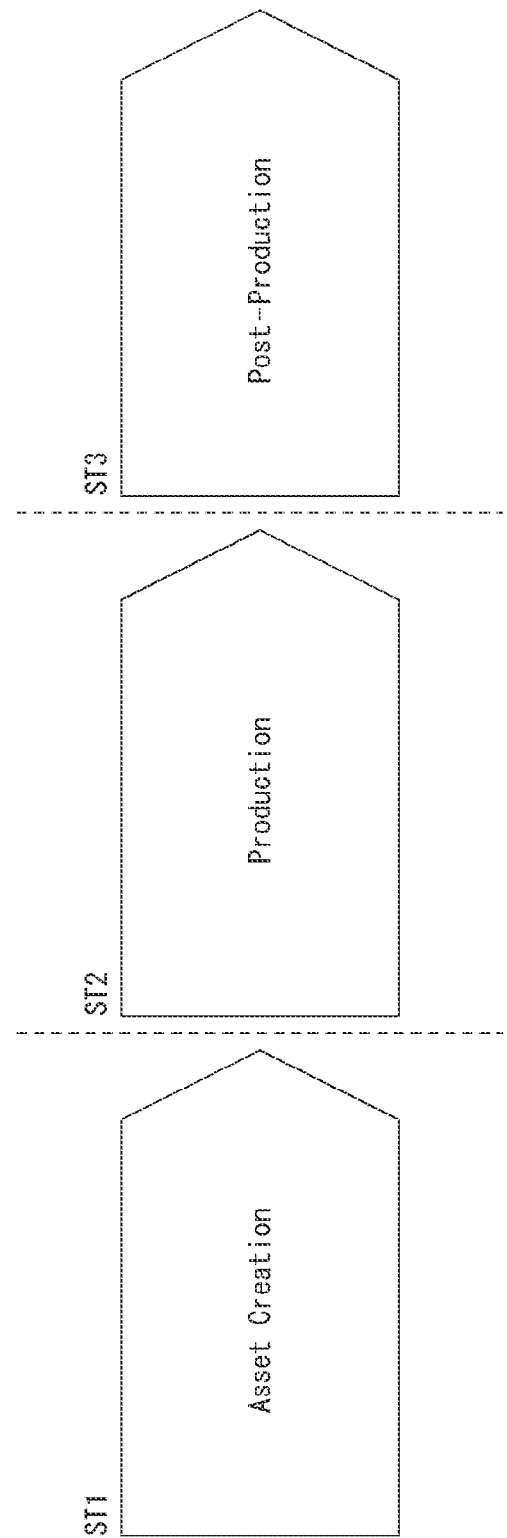
FIG. 4 is an explanatory diagram of a video content producing step of the embodiment.

Here, a process of producing a video content as virtual production in which imaging is performed by the imaging system 500 will be described. As illustrated in FIG. 4, the video content production process is roughly divided into three stages. The stages are asset creation ST1, production ST2, and post-production ST3.

The asset creation ST1 is a process of creating 3D background data for displaying the background video vB. As described above, the background video vB is generated by performing rendering in real time using the 3D background data at the time of imaging. For this purpose, 3D background data as a 3D model is produced in advance.

Examples of a method of producing the 3D background data include full computer graphics (CG), point cloud data (Point Cloud) scan, and photogrammetry.

The full CG is a method of producing a 3D model with computer graphics. Among the three methods, the method requires the most man-hours and time, but is preferably used in a case where an unrealistic video, a video that is difficult to capture in practice, or the like is desired to be the background video vB.

The point cloud data scanning is a method of generating a 3D model based on the point cloud data by performing distance measurement from a certain position using, for example, LiDAR, capturing an image of 360 degrees by a camera from the same position, and placing color data captured by the camera on a point measured by the LiDAR. Compared with the full CG, the 3D model can be created in a short time. Furthermore, it is easy to produce a 3D model with higher definition than that of photogrammetry.

Photogrammetry is a photogrammetry technology for analyzing parallax information from two-dimensional images obtained by imaging an object from a plurality of viewpoints to obtain dimensions and shapes. 3D model creation can be performed in a short time.

Note that the point cloud information acquired by the LIDAR may be used in the 3D data generation by the photogrammetry.

In the asset creation ST1, for example, a 3D model to be 3D background data is created using these methods. Of course, the above methods may be used in combination. For example, a part of a 3D model produced by point cloud data scanning or photogrammetry is produced by CG and synthesized.

The production ST2 is a process of performing imaging in the imaging studio as illustrated in FIG. 1. Element technologies in this case include real-time rendering, background display, camera tracking, lighting control, and the like.

The real-time rendering is rendering processing for obtaining the capturing region video vBC at each time point (each frame of the background video vB) as described with reference to FIGS. 2 and 3. This is to render the 3D background data created in the asset creation ST1 from a viewpoint corresponding to the position of the camera 502 or the like at each time point.

In this way, the real-time rendering is performed to generate the background video vB of each frame including the capturing region video vBC, and the background video vB is displayed on the LED wall 505.

The camera tracking is performed to obtain imaging information by the camera 502, and tracks position information, an imaging direction, an angle of view, and the like at each time point of the camera 502. By providing the imaging information including these to a rendering engine in association with each frame, real-time rendering according to the viewpoint position or the like of the camera 502 can be executed.

The imaging information is information linked with or associated with a video as metadata.

It is assumed that the imaging information includes position information of the camera 502 at each frame timing, a direction of the camera, an angle of view, a focal length, an f-number (aperture value), a shutter speed, lens information, and the like.

The illumination control is to control the state of illumination in the imaging system 500, and specifically, to control the light amount, emission color, illumination direction, and the like of a light 580. For example, illumination control is performed according to time setting of a scene to be imaged, setting of a place, and the like.

The post-production ST3 indicates various processes performed after imaging. For example, video correction, video adjustment, clip editing, video effect, and the like are performed.

As the video correction, color gamut conversion, color matching between cameras and materials, and the like may be performed.

As the video adjustment, color adjustment, luminance adjustment, contrast adjustment, and the like may be performed.

As the clip editing, cutting of clips, adjustment of order, adjustment of a time length, and the like may be performed as the clip editing.

As a video effect, there is a case where a synthesis of a CG video or a special effect video or the like is performed.

Next, a configuration of the imaging system 500 used in the production ST2 will be described.

Figure 5:
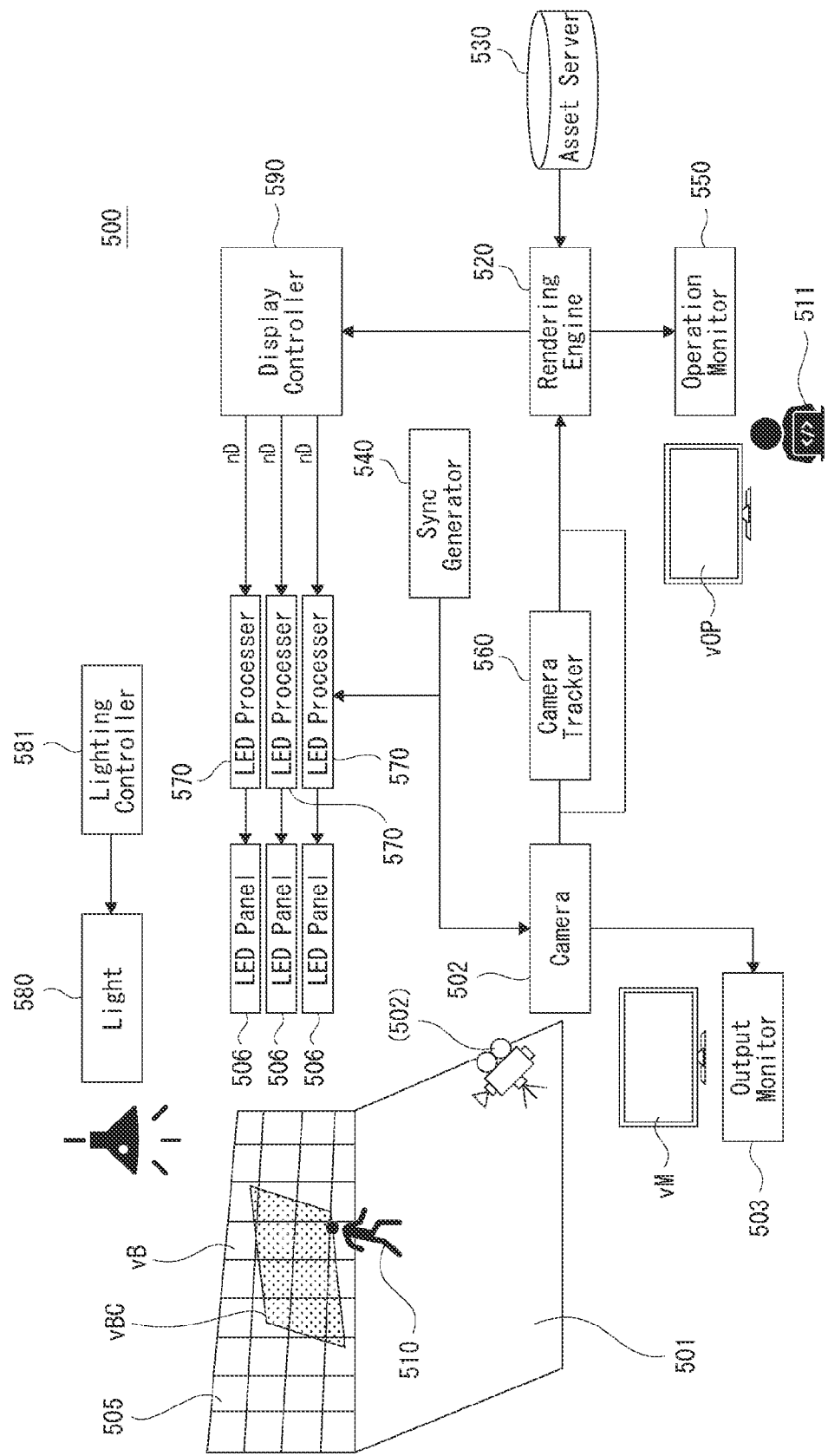
FIG. 5 is a block diagram of the imaging system of the embodiment.

FIG. 5 is a block diagram illustrating a configuration of the imaging system 500 whose outline has been described with reference to FIGS. 1, 2, and 3.

The imaging system 500 illustrated in FIG. 5 includes the above-described LED wall 505 including the plurality of LED panels 506, the camera 502, the output monitor 503, and the light 580. As illustrated in FIG. 5, the imaging system 500 further includes a rendering engine 520, an asset server 530, a sync generator 540, an operation monitor 550, a camera tracker 560, LED processors 570, a lighting controller 581, and a display controller 590.

The LED processors 570 are provided corresponding to the LED panels 506, and perform video display driving of the corresponding LED panels 506.

The sync generator 540 generates a synchronization signal for synchronizing frame timings of display videos by the LED panels 506 and a frame timing of imaging by the camera 502, and supplies the synchronization signal to the respective LED processors 570 and the camera 502. However, this does not prevent output from the sync generator 540 from being supplied to the rendering engine 520.

The camera tracker 560 generates imaging information by the camera 502 at each frame timing and supplies the imaging information to the rendering engine 520. For example, the camera tracker 560 detects the position information of the camera 502 relative to the position of the LED wall 505 or a predetermined reference position and the imaging direction of the camera 502 as one of the imaging information, and supplies them to the rendering engine 520.

As a specific detection method by the camera tracker 560, there is a method of randomly disposing a reflector on the ceiling and detecting a position from reflected light of infrared light emitted from the camera 502 side to the reflector. Furthermore, as a detection method, there is also a method of estimating the self-position of the camera 502 by information of a gyro mounted on a platform of the camera 502 or a main body of the camera 502, or image recognition of a captured video of the camera 502.

Furthermore, an angle of view, a focal length, an F value, a shutter speed, lens information, and the like may be supplied from the camera 502 to the rendering engine 520 as the imaging information.

The asset server 530 is a server that can store a 3D model created in the asset creation ST1, that is, 3D background data on a recording medium and read the 3D model as necessary. That is, it functions as a database (DB) of 3D background data.

The rendering engine 520 performs processing of generating the background video vB to be displayed on the LED wall 505. For this reason, the rendering engine 520 reads necessary 3D background data from the asset server 530. Then, the rendering engine 520 generates a video of the outer frustum used in the background video vB as a video obtained by rendering the 3D background data in a form of being viewed from spatial coordinates specified in advance.

Furthermore, as processing for each frame, the rendering engine 520 specifies the viewpoint position and the like with respect to the 3D background data using the imaging information supplied from the camera tracker 560 or the camera 502, and renders the capturing region video vBC (inner frustum).

Moreover, the rendering engine 520 synthesizes the capturing region video vBC rendered for each frame with the outer frustum generated in advance to generate the background video vB as the video data of one frame. Then, the rendering engine 520 transmits the generated video data of one frame to the display controller 590.

The display controller 590 generates divided video signals nD obtained by dividing the video data of one frame into video portions to be displayed on the respective LED panels 506, and transmits the divided video signals nD to the respective LED panels 506. At this time, the display controller 590 may perform calibration according to individual differences of color development or the like, manufacturing errors, and the like between display units.

Note that the display controller 590 may not be provided, and the rendering engine 520 may perform these processes. That is, the rendering engine 520 may generate the divided video signals nD, perform calibration, and transmit the divided video signals nD to the respective LED panels 506.

By the LED processors 570 driving the respective LED panels 506 on the basis of the respective received divided video signals nD, the entire background video vB is displayed on the LED wall 505. The background video vB includes the capturing region video vBC rendered according to the position of the camera 502 or the like at that time.

The camera 502 can capture the performance of the performer 510 including the background video vB displayed on the LED wall 505 in this manner. The video obtained by imaging by the camera 502 is recorded on a recording medium in the camera 502 or an external recording device (not illustrated), and is supplied to the output monitor 503 in real time and displayed as a monitor video vM.

The operation monitor 550 displays an operation image vOP for controlling the rendering engine 520. An engineer 511 can perform necessary settings and operations regarding rendering of the background video vB while viewing the operation image vOP.

The lighting controller 581 controls emission intensity, emission color, irradiation direction, and the like of the light 580. For example, the lighting controller 581 may control the light 580 asynchronously with the rendering engine 520, or may perform control in synchronization with the imaging information and the rendering processing. Therefore, the lighting controller 581 may perform light emission control in accordance with an instruction from the rendering engine 520, a master controller (not illustrated), or the like.

Figure 6:
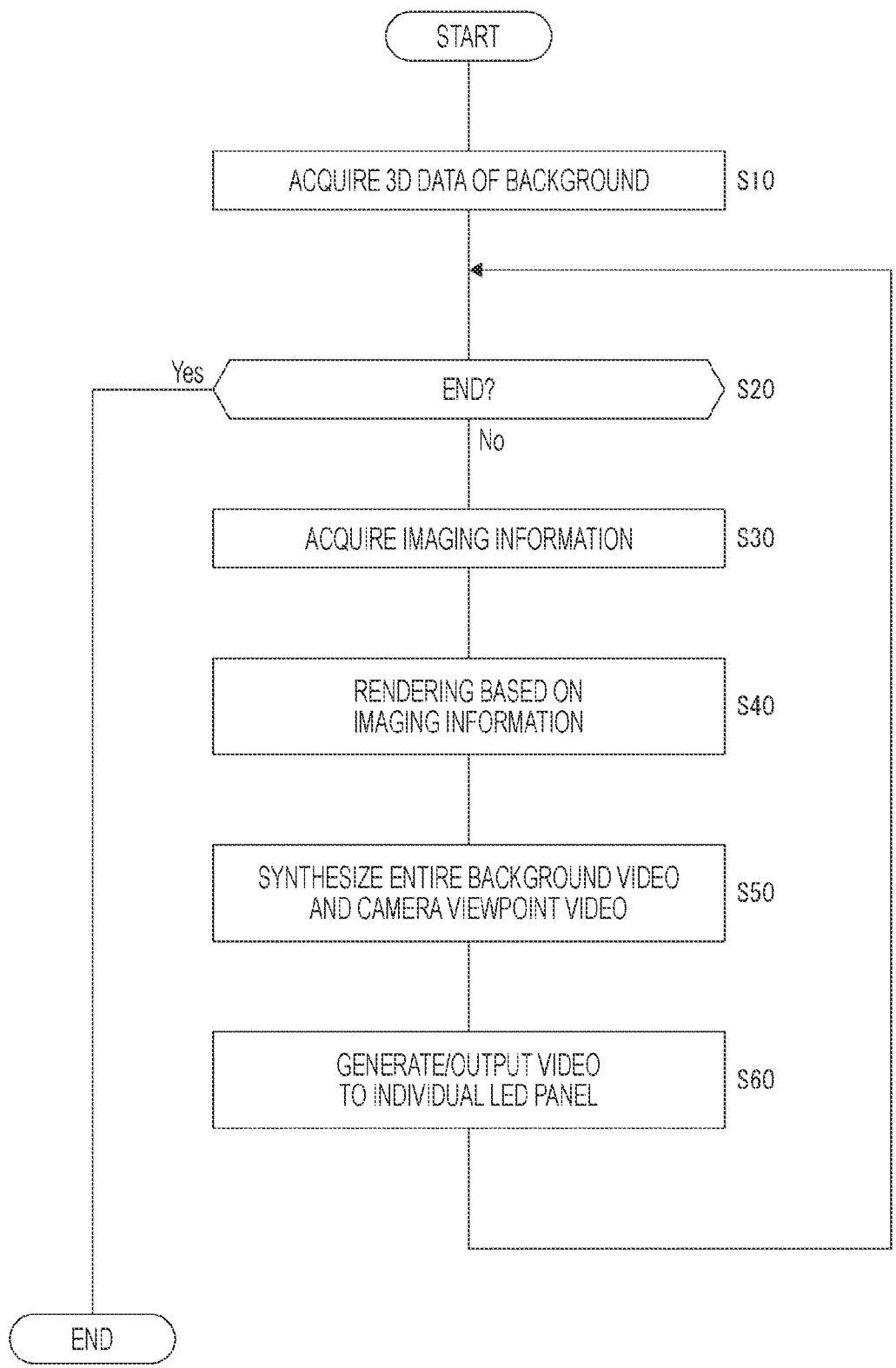
FIG. 6 is a flowchart of background video generation of the imaging system of the embodiment.

FIG. 6 illustrates a processing example of the rendering engine 520 in the imaging system 500 having such a configuration.

In step S10, the rendering engine 520 reads the 3D background data to be used this time from the asset server 530, and develops the 3D background data in an internal work area.

Then, a video used as the outer frustum is generated.

Thereafter, the rendering engine 520 repeats the processing from step S30 to step S60 at each frame timing of the background video vB until it is determined in step S20 that the display of the background video vB based on the read 3D background data is ended.

In step S30, the rendering engine 520 acquires the imaging information from the camera tracker 560 and the camera 502. Thus, the position and state of the camera 502 to be reflected in the current frame are confirmed.

In step S40, the rendering engine 520 performs rendering on the basis of the imaging information. That is, the viewpoint position with respect to the 3D background data is specified on the basis of the position, the imaging direction, the angle of view, and the like of the camera 502 to be reflected in the current frame, and rendering is performed. At this time, video processing reflecting a focal length, an F value, a shutter speed, lens information, and the like can also be performed. By this rendering, video data as the capturing region video vBC can be obtained.

In step S50, the rendering engine 520 performs processing of synthesizing the outer frustum, which is the entire background video, and the video reflecting the viewpoint position of the camera 502, that is, the capturing region video vBC. For example, the processing is to synthesize a video generated by reflecting the viewpoint of the camera 502 with a video of the entire background rendered at a specific reference viewpoint. Thus, the background video vB of one frame displayed on the LED wall 505, that is, the background video vB including the capturing region video vBC is generated.

The processing in step S60 is performed by the rendering engine 520 or the display controller 590. In step S60, the rendering engine 520 or the display controller 590 generates the divided video signals nD obtained by dividing the background video vB of one frame into videos to be displayed on the individual LED panels 506. Calibration may be performed. Then, the respective divided video signals nD are transmitted to the respective LED processors 570.

By the above processing, the background video vB including the capturing region video vBC captured by the camera 502 is displayed on the LED wall 505 at each frame timing.

Figure 7:
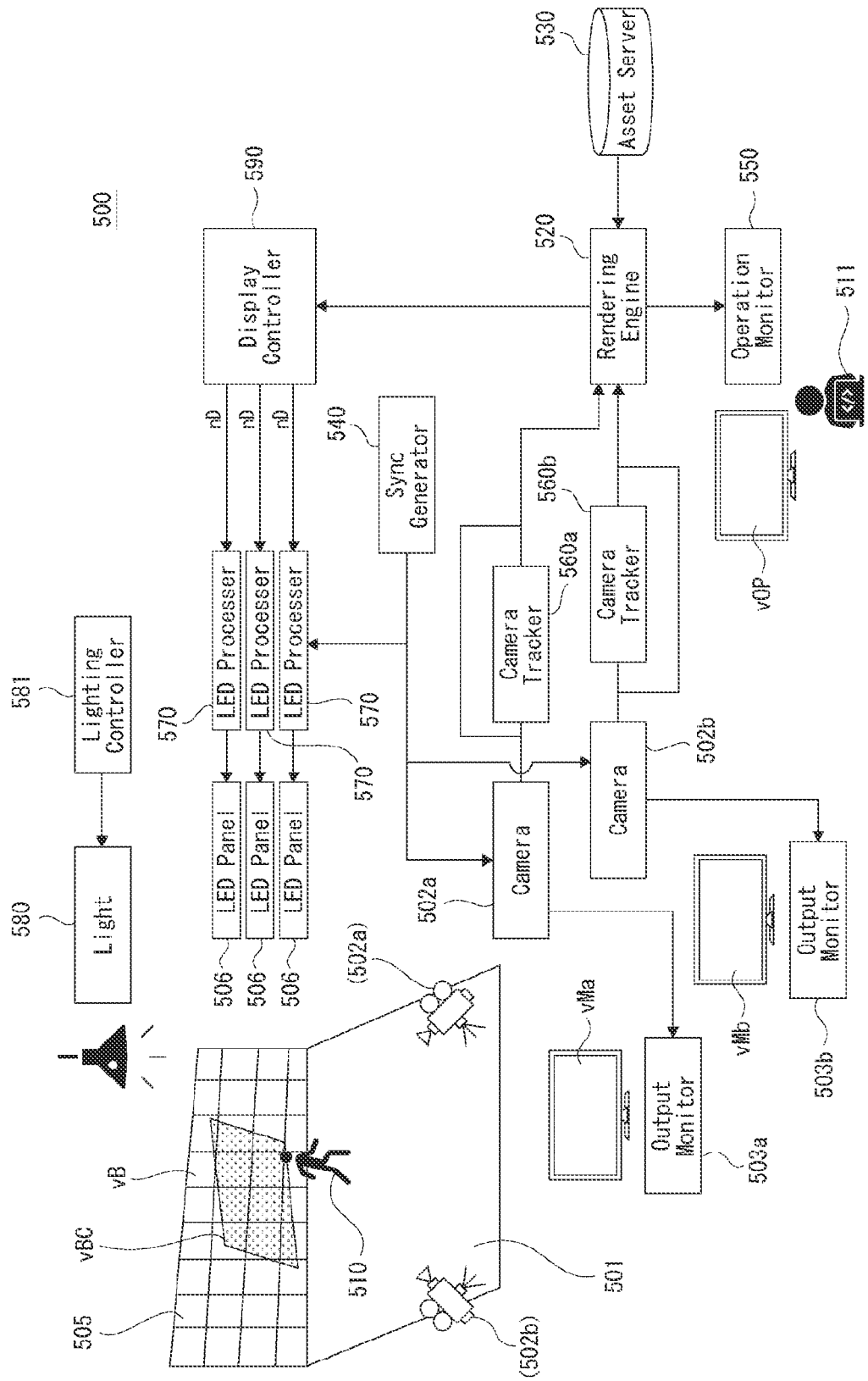
FIG. 7 is a block diagram of the imaging system using a plurality of cameras of the embodiment.

Incidentally, only one camera 502 is illustrated in FIG. 5, but imaging can be performed by a plurality of cameras 502. FIG. 7 illustrates a configuration example in a case where a plurality of cameras 502a and 502b is used. The cameras 502a and 502b can independently perform imaging in the performance area 501. Furthermore, synchronization between the cameras 502a and 502b and the LED processors 570 is maintained by the sync generator 540.

Output monitors 503a and 503b are provided corresponding to the cameras 502a and 502b, and are configured to display the videos captured by the corresponding cameras 502a and 502b as monitor videos vMa and vMb, respectively.

Furthermore, camera trackers 560a and 560b are provided corresponding to the cameras 502a and 502b, respectively, and detect the positions and imaging directions of the corresponding cameras 502a and 502b, respectively. The imaging information from the camera 502a and the camera tracker 560a and the imaging information from the camera 502b and the camera tracker 560b are transmitted to the rendering engine 520.

The rendering engine 520 can perform rendering for obtaining the background video vB of each frame using the imaging information of either the camera 502a side or the camera 502b side.

Note that although FIG. 7 illustrates an example using the two cameras 502a and 502b, it is also possible to perform imaging using three or more cameras 502.

However, in a case where the plurality of cameras 502 is used, there is a circumstance that the capturing region video vBC corresponding to each camera 502 interferes. For example, in the example in which the two cameras 502a and 502b are used as illustrated in FIG. 7, the capturing region video vBC corresponding to the camera 502a is illustrated, but in a case where the video of the camera 502b is used, the capturing region video vBC corresponding to the camera 502b is also necessary. When the capturing region video vBC corresponding to each of the cameras 502a and 502b is simply displayed, they interfere with each other. Therefore, it is necessary to contrive the display of the capturing region video vBC.

2. Configuration of Information Processing Device

Next, a configuration example of the information processing device 70 that can be used in the asset creation ST1, the production ST2, and the post-production ST3 will be described with reference to FIG. 8.

The information processing device 70 is a device capable of performing information processing, particularly video processing, such as a computer device. Specifically, a personal computer, a workstation, a portable terminal device such as a smartphone and a tablet, a video editing device, and the like are assumed as the information processing device 70. Furthermore, the information processing device 70 may be a computer device configured as a server device or an arithmetic device in cloud computing.

In the case of the present embodiment, specifically, the information processing device 70 can function as a 3D model creation device that creates a 3D model in the asset creation ST1.

Furthermore, the information processing device 70 can function as the rendering engine 520 constituting the imaging system 500 used in the production ST2. Moreover, the information processing device 70 can also function as the asset server 530.

Furthermore, the information processing device 70 can also function as a video editing device that performs various types of video processing in the post-production ST3.

Figure 8:
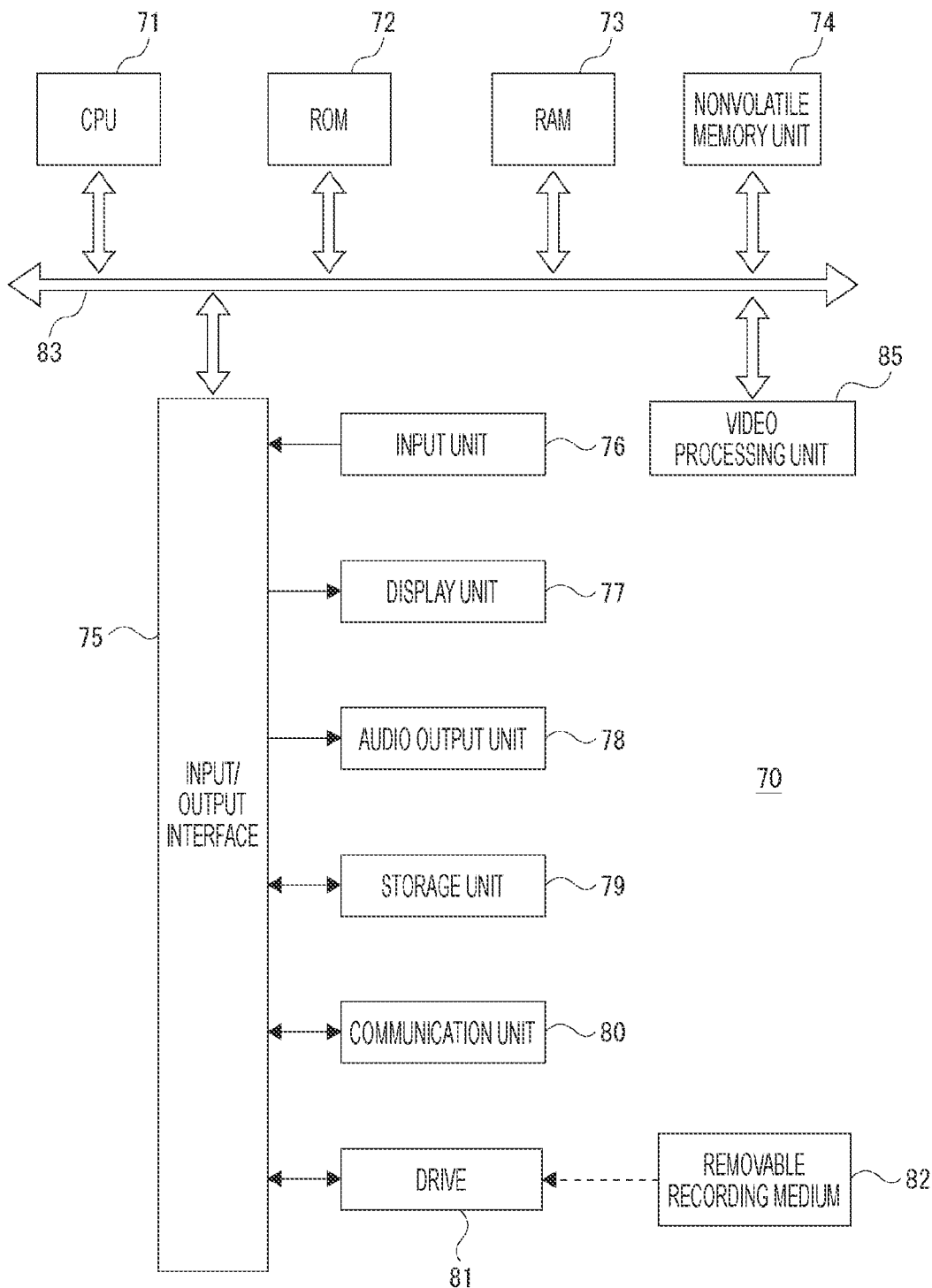
FIG. 8 is a block diagram of an information processing device of the embodiment.

A CPU 71 of the information processing device 70 illustrated in FIG. 8 executes various processes in accordance with a program stored in a nonvolatile memory unit 74 such as a ROM 72 or, for example, an electrically erasable programmable read-only memory (EEP-ROM), or a program loaded from a storage unit 79 to a RAM 73. The RAM 73 also appropriately stores data and the like necessary for the CPU 71 to execute the various types of processing.

A video processing unit 85 is configured as a processor that performs various types of video processing. For example, the processor is a processor capable of performing any one of 3D model generation processing, rendering, DB processing, video editing processing, and the like, or a plurality of types of processing.

The video processing unit 85 can be implemented by, for example, a CPU, a graphics processing unit (GPU), generalpurpose computing on graphics processing units (GPGPU), an artificial intelligence (AI) processor, or the like that is separate from the CPU 71.

Note that the video processing unit 85 may be provided as a function in the CPU 71.

The CPU 71, the ROM 72, the RAM 73, the nonvolatile memory unit 74, and the video processing unit 85 are connected to one another via a bus 83. An input/output interface 75 is also connected to the bus 83.

An input unit 76 including an operation element and an operation device is connected to the input/output interface 75. For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to an input operation is interpreted by the CPU 71.

A microphone is also assumed as the input unit 76. A voice uttered by the user can also be input as the operation information.

Furthermore, a display unit 77 including a liquid crystal display (LCD), an organic electro-luminescence (EL) panel, or the like, and an audio output unit 78 including a speaker or the like are integrally or separately connected to the input/output interface 75.

The display unit 77 is a display unit that performs various types of displays, and includes, for example, a display device provided in a housing of the information processing device 70, a separate display device connected to the information processing device 70, and the like.

The display unit 77 displays various images, operation menus, icons, messages, and the like, that is, displays as a graphical user interface (GUI), on the display screen on the basis of the instruction from the CPU 71.

In some cases, the storage unit 79 including a hard disk drive (HDD), a solid-state memory, or the like or a communication unit 80 is connected to the input/output interface 75.

The storage unit 79 can store various pieces of data and programs. A DB can also be configured in the storage unit 79.

For example, in a case where the information processing device 70 functions as the asset server 530, a DB that stores a 3D background data group can be constructed using the storage unit 79.

The communication unit 80 performs communication processing via a transmission path such as the Internet, wired/wireless communication with various devices such as an external DB, an editing device, and an information processing device, bus communication, and the like.

For example, in a case where the information processing device 70 functions as the rendering engine 520, the communication unit 80 can access the DB as the asset server 530, and receive imaging information from the camera 502 or the camera tracker 560.

Furthermore, also in a case of the information processing device 70 used in the post-production ST3, the communication unit 80 can access the DB as the asset server 530.

A drive 81 is also connected to the input/output interface 75 as necessary, and a removable recording medium 82 such as a magnetic disk, an optical disk, a magneto-optical disk, a semiconductor memory, or the like is appropriately mounted.

The drive 81 can read video data, various computer programs, and the like from the removable recording medium 82. The read data is stored in the storage unit 79, and video and audio included in the data are output by the display unit 77 and the audio output unit 78. In addition, the computer program and the like read from the removable recording medium 82 are installed in the storage unit 79, as necessary.

In the information processing device 70, for example, software for the processing of the present embodiment can be installed via network communication by the communication unit 80 or the removable recording medium 82. Alternatively, the software may be stored in advance in the ROM 72, the storage unit 79, or the like.

3. Substitution of Background Video

Hereinafter, a processing example as an embodiment will be described.

In the processing example of the embodiment in the present disclosure, processing of replacing the background video vB (in this case, the range of the capturing region video vBC) with a background video vRP in real time is performed for the captured video in the process of the production ST2.

Alternatively, in the processing example, processing of replacing the captured background video vB (the capturing region video vBC) with the background video vRP may be performed in the post-production ST3 for the video captured in the process of the production ST2.

Note that the background video vB indicates the entire video displayed as the background including the capturing region video vBC (inner frustum). In particular, since it is the background of the imaged range that is subjected to the replacement processing, the video to be replaced is the range of the capturing region video vBC in the background video vB.

Furthermore, in the processing example of the embodiment, the background video vRP used for replacement may be the same video as the background video vB (the capturing region video vBC) or may be a different video. The different video is assumed to be, for example, a video having the same content but based on updated 3D background data, a video having different resolution, frame rate, or the like, or a video having a different viewpoint position, imaging direction, or angle of view.

First, the reason for performing the processing of replacing the background video vB (the range of the capturing region video vBC) included in the captured video with the background video vRP will be described.

The video captured by the camera 502 by the above-described virtual production imaging system 500 is referred to as a "captured video vC". The video content of the captured video vC is the same as that of the monitor video vM.

The captured video vC is obtained by imaging an object such as the performer 510 and the background video vB of the LED wall 505 by the camera 502.

Figure 9:
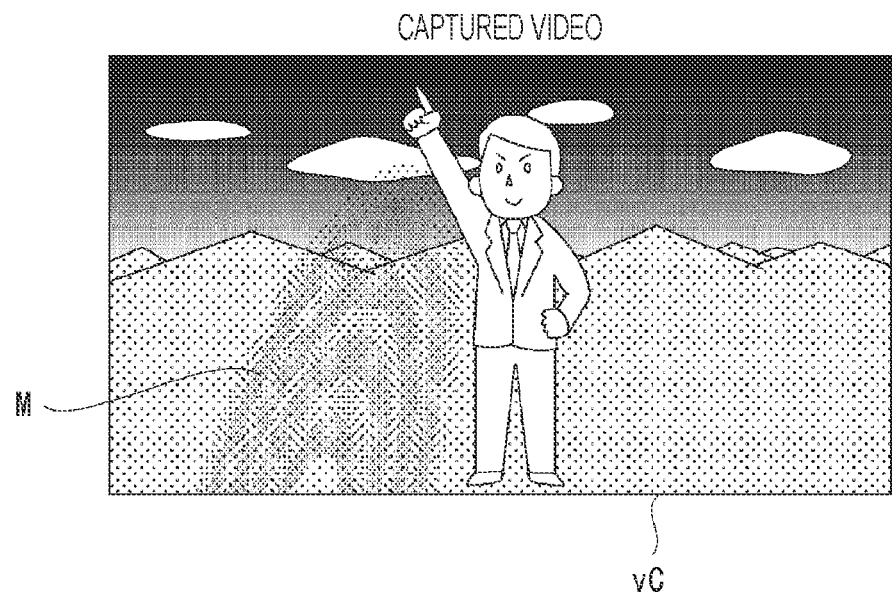
FIG. 9 is an explanatory diagram of moire in a case where a background video is captured.
Figure 10:
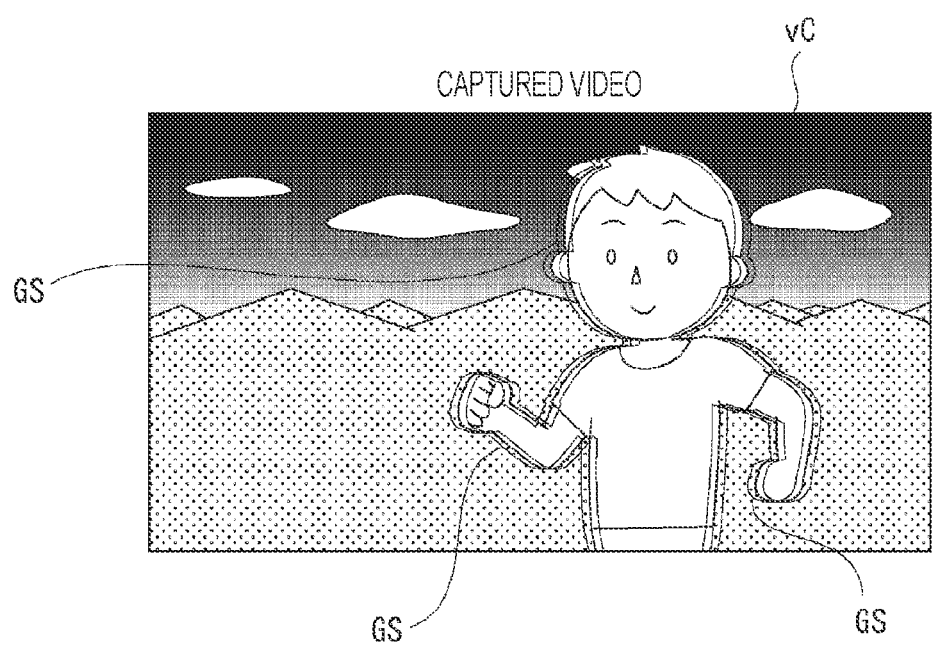
FIG. 10 is an explanatory diagram of a ghost in a case where a background video is captured.

In the captured video vC, various artifacts occur, for example, moire (interference fringes) M occurs as illustrated in FIG. 9, or a ghost GS occurs before and after a moving subject in a moving direction as illustrated in FIG. 10.

These are caused by capturing the background video vB displayed on the LED wall 505. Therefore, in order to prevent the completed video content from being affected by such artifacts at the time of imaging, it is sufficient if the background video vB in the captured video vC is replaced.

Replacement processing will be schematically described.

FIG. 11A illustrates a captured video vC in which moire M is generated.

In order to cut out the captured video vC, a mask (α) as illustrated in FIG. 11B is generated. The mask (α) is for separating the background and the foreground in the captured video vC. The background is the background video vB displayed on the LED wall 505, and the foreground is the performer 510 or an actual object that is a subject in the performance area 501.

Further, FIG. 11C illustrates the background video vB at the time of imaging. This illustrates a video as the background video vB supplied to the LED wall 505. This is not a captured video, and thus is the original background video vB in which an artifact such as moire M has not occurred. For example, the background video vB is set as a background video vRP for replacing with a video including the moire M or the like.

Next, the foreground is cut out from the captured video vC of FIG. 11C using the mask (α) to obtain a foreground video vA as illustrated in FIG. 12A. Here, an example is illustrated in which the object serving as the foreground is only a person (performer 510) and a video of the person is cut out. Note that, in the drawings, a lattice pattern around a person indicates that it is transparent (not a white image).

Moreover, the background video vRP of FIG. 11C to be used in place of the background is multiplied by mask inversion data (1−α) obtained by inverting the mask (α) to generate a video (1−α)·vRP as illustrated in FIG. 12B. This is video data in which only the region of the person as the foreground is made transparent from the background video vRP of FIG. 11C.

Then, the foreground video vA in FIG. 12A and the video (1−α)·vRP in FIG. 12B are added. This is referred to as a synthesized video vMX in FIG. 12C.

Since the synthesized video vMX uses the background video vRP in which the moire M has not occurred, the video content is the same as that of the captured video vC in FIG. 11A, but the moire M and other artifacts are eliminated.

By replacing such a background video as described above, it is possible to perform imaging as virtual production without worrying about artifacts caused by capturing the background video vB displayed on the LED wall 505.

Furthermore, by managing the 3D background data as a background asset and the background video vB used at the time of imaging using the ID code or the like, for example, the background video vRP can be automatically read or generated at the time of the post-production ST3, and the replacement processing can be performed automatically or semi-automatically.

Four processing examples will be described below as specific processing examples of the background video replacement.

The first processing example is an example in which the background video vB displayed on the LED wall 505 at the time of imaging (or at least the range of the capturing region video vBC) is recorded, and the background video vB is read in real time after the imaging or at the time of the post-production ST3 to obtain the background video vRP.

The second processing example is an example in which the background video vB (at least the range of the capturing region video vBC) used at the time of imaging is read, and edited to be the background video vRP.

The third processing example is an example in which the background video vRP is generated by newly performing rendering on the basis of the imaging information at the time of imaging.

The fourth processing example is an example in which rendering is newly performed on the basis of the imaging information at the time of imaging, and the rendered video is edited to be the background video vRP.

Among the above, in the case of the first processing example, the background video vRP is the same video data as the capturing region video vBC in the background video vB.

On the other hand, in the second, third, and fourth processing examples, the background video vRP is obtained by processing the capturing region video vBC in the background video vB or newly generating the background video vRP, and thus the background video vRP is video data different from the capturing region video vBC in the background video vB.

Furthermore, in the third and fourth processing examples, rendering is performed again to generate the background video vRP, but the 3D background data in this case may be the same 3D model or may be different 3D models.

Note that the replacement processing of the background video in each processing example targets the captured video vC captured by the camera 502, and the captured background video vB thereof is the range of the capturing region video vBC described in FIGS. 2 and 3. Therefore, the background video vRP used for replacement is also the capturing region video vBC of the camera 502.

Each processing example described below is processing executed by the video processing unit 85 in the information processing device 70 that executes replacement processing of the background video in real time at the time of imaging (hereinafter referred to as "real-time processing") and replacement processing of the background video in the post-production ST3.

The information processing device 70 may be considered as a rendering engine 520 that performs real-time processing in the rendering engine 520, and the information processing device 70 may be implemented as a computer device or a video editing device used in the post-production ST3. Furthermore, for example, in a case where the rendering engine 520 is used in the post-production ST3, the information processing device 70 may be considered as the rendering engine 520.

Furthermore, for example, at the stage of the production ST2, the background video can be replaced by cloud computing as real-time processing. In that case, the information processing device 70 that performs the processing described below may be configured as a cloud server.

4. First Processing Example

A first processing example will be described. In each of the first to fourth processing examples, the background video is replaced by each processing of foreground processing, background processing, and synthesis processing.

The foreground processing, the background processing, and the synthesis processing are executed for each frame of the captured video vC.

Figure 13:
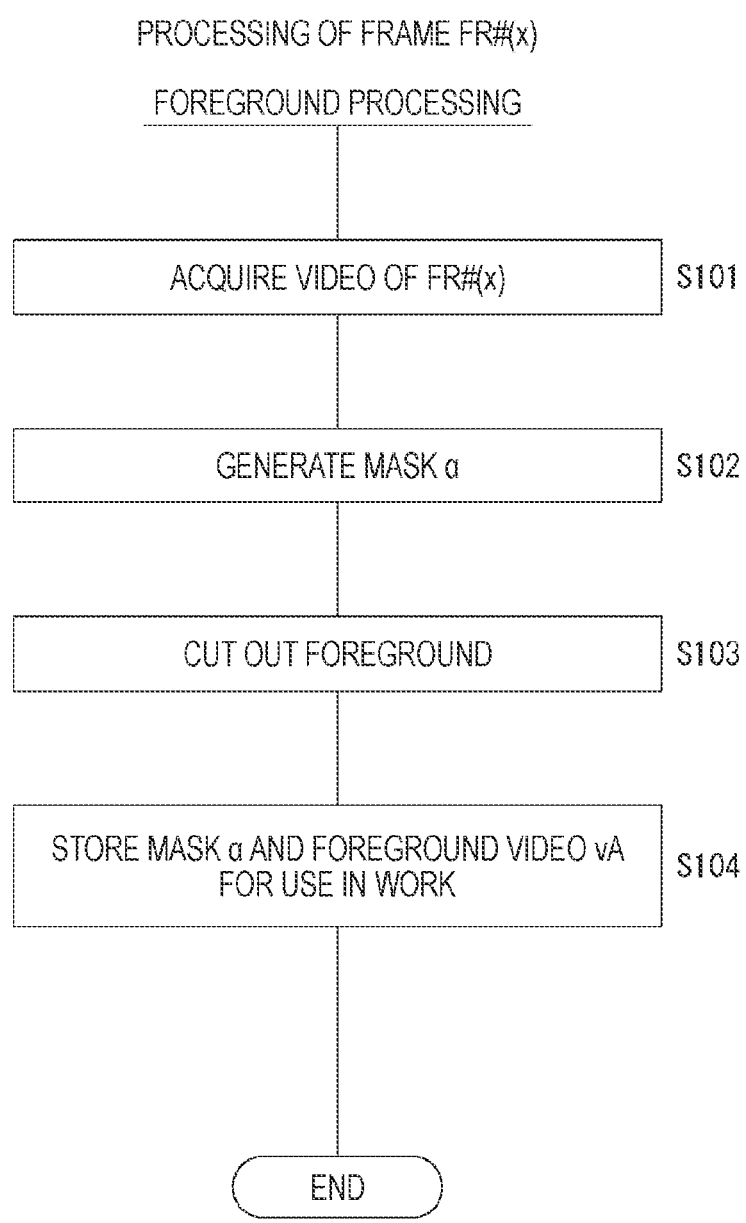
FIG. 13 is a flowchart of foreground processing of the embodiment.

The foreground processing is illustrated in FIG. 13. This is processing of generating the foreground video vA illustrated in FIG. 12A.

First, in step S101, the information processing device 70 acquires the video data of a frame #(x) of the captured video vC. That is, one frame of video data read from the recording medium on which the captured video vC is recorded is fetched as a processing target.

In step S102, the information processing device 70 generates a mask α from the fetched video data. That is, the foreground portion and the background portion are determined in the fetched video data of one frame, and a mask α as illustrated in FIG. 11B for cutting out the foreground portion is generated.

In step S103, the information processing device 70 cuts out the foreground. That is, the foreground is cut out from the captured video vC as illustrated in FIG. 11A using the mask α, and the foreground video vA as illustrated in FIG. 12A is generated.

In step S104, the information processing device 70 stores the generated mask α and the foreground video vA for use in work in the synthesis processing described later. For example, the data is temporarily stored in a work area in the RAM 73 or the like or the storage unit 79, so that it can be used for subsequent synthesis processing.

Thus, the foreground processing for one frame of the captured video vC is terminated.

Figure 14:
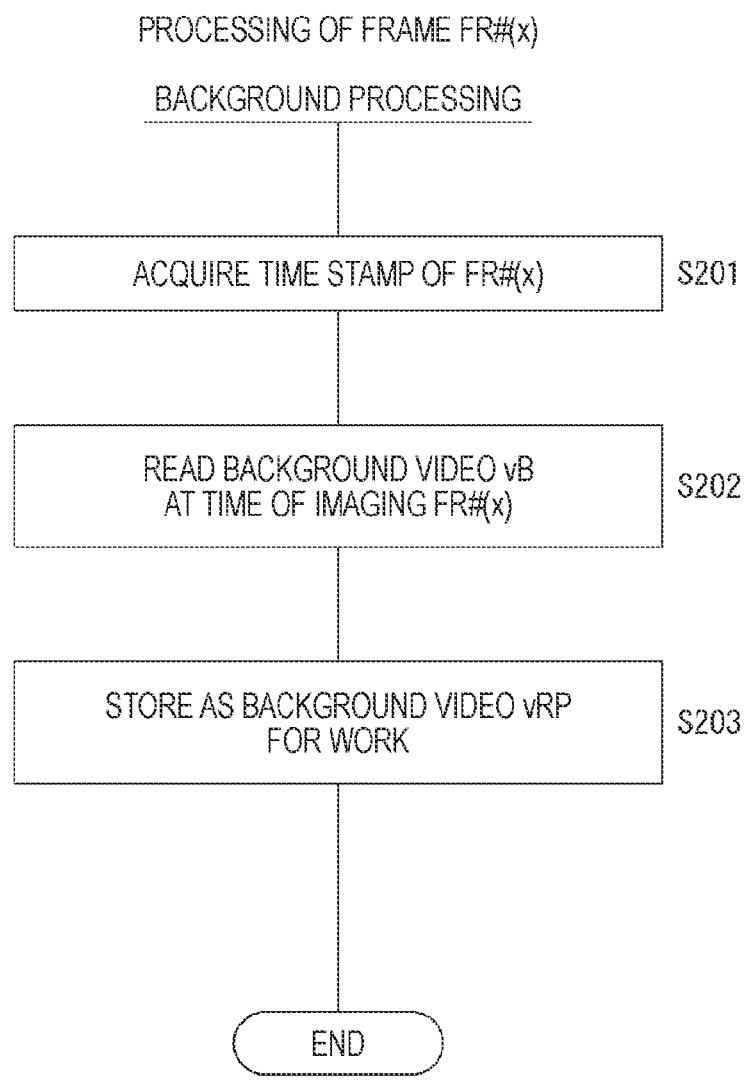
FIG. 14 is a flowchart of background processing of a first embodiment.

The background processing is illustrated in FIG. 14.

In step S201, the information processing device 70 acquires a time stamp of the frame #(x) to be processed in the captured video vC.

Note that, as a premise of the first processing example, it is assumed that the background video vB of each frame generated by the rendering engine 520 is recorded on the recording medium when imaging is performed in the process of the production ST2.

For example, in a case where the background video vB is generated in step S50 of FIG. 6, the video data of the background video vB or at least the capturing region video vBC in the background video vB is recorded on the recording medium. For example, the information may be recorded in the asset server 530 or may be recorded on another recording medium (not illustrated). In any case, recording is performed in a state readable by the information processing device 70 in real-time processing or in the post-production ST3 stage.

Moreover, the background video vB (or the capturing region video vBC) is recorded in association with the time stamp of the frame of the corresponding captured video vC. For example, a time stamp of "hour: minute: second: frame" is added. The frame of the corresponding captured video vC is the frame of the captured video vC captured at the timing when the frame of the background video vB is displayed. That is, it is a frame of the captured video vC in which the capturing region video vBC in the background video vB is shown.

Thus, the time stamp becomes a time stamp that matches the frame in the captured video vC with the background video vB captured in the frame.

The background processing of FIG. 14 is executed on the assumption that such recording processing of the background video vB at the time of imaging is performed.

After acquiring the time stamp of the frame #(x) of the captured video vC to be currently processed in step S201, the information processing device 70 reads the frame of the background video vB displayed on the LED wall 505 at the time of imaging from the recording medium on the basis of the time stamp in step S202.

Then, in step S203, the information processing device 70 stores the range of the capturing region video vBC in the background video vB as it is as the background video vRP for work. For example, it is temporarily stored in the work area such as the RAM 73 or the storage unit 79, so that it can be used for subsequent synthesis processing. Thus, the background video vRP for the current frame #(x) as illustrated in FIG. 11C is generated.

Thus, the background processing for one frame of the captured video vC is terminated.

Figure 15:
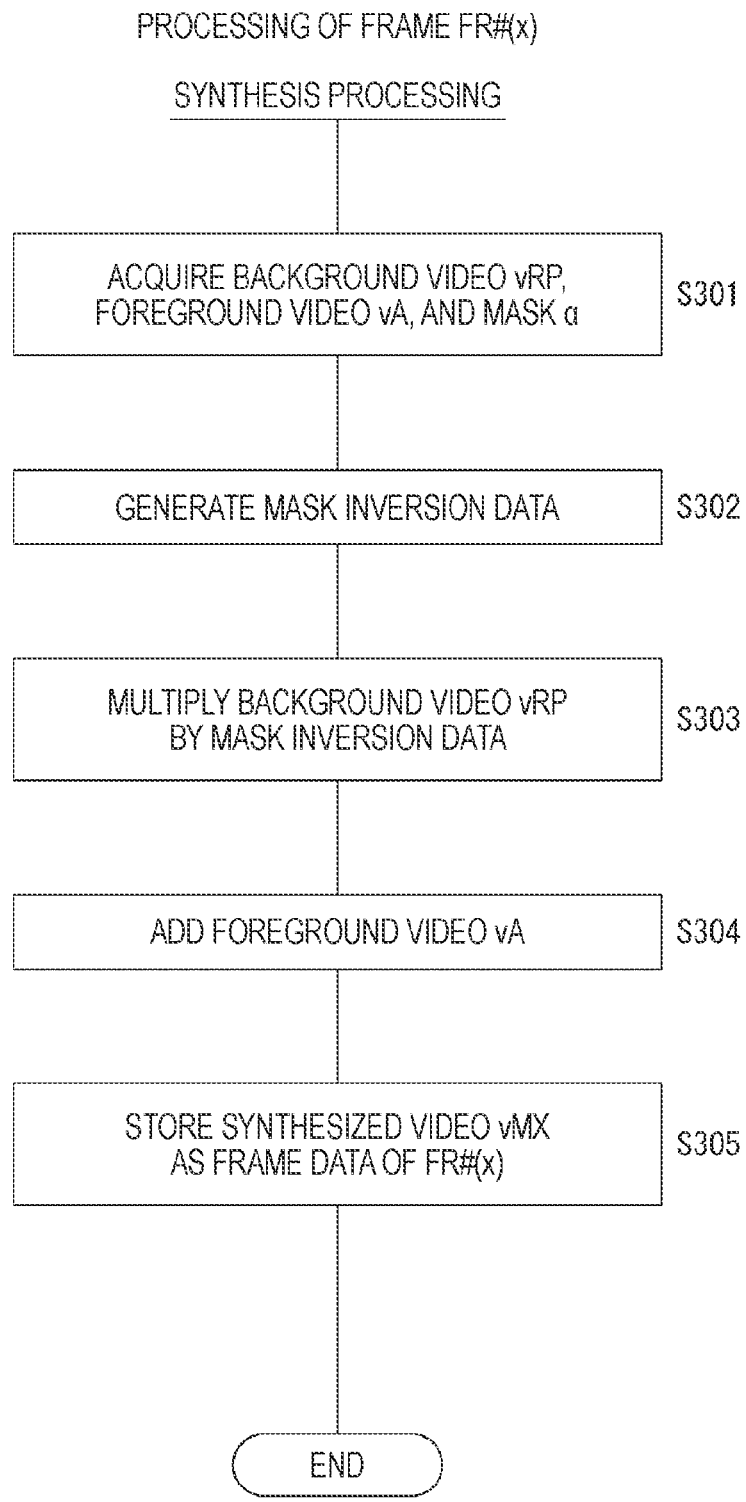
FIG. 15 is a flowchart of synthesis processing of the embodiment.

The synthesis processing is illustrated in FIG. 15.

In step S301, the information processing device 70 acquires the background video vRP, the foreground video vA, and the mask α temporarily stored in the preceding foreground processing and background processing as processing targets.

In step S302, the information processing device 70 inverts the mask α and generates mask inversion data (1−α).

In step S303, the information processing device 70 multiplies the background video vRP by the mask inversion data to generate video data as the video (1−α)·vRP in FIG. 12B.

In step S304, the information processing device 70 further adds the foreground video vA to the video data in step S303. Thus, the synthesized video vMX as illustrated in FIG. 12C is obtained.

In step S305, the information processing device 70 performs processing of storing the synthesized video vMX as frame data to be replaced with the frame #(x) of the captured video vC. For example, the information processing device 70 stores the synthesized video vMX as one-frame data as a video of a completed product of the video content.

As described above, in the first processing example, the background video vB displayed on the LED wall 505 at the time of imaging is recorded, and the capturing region video vBC of the background video vB is set as the background video vRP. By replacing the background using the background video vRP, the video in which the artifact is eliminated is generated.

5. Second Processing Example

The second processing example will be described. Note that, in the following second, third, and fourth processing examples, the foreground processing and the synthesis processing are similar to those in FIGS. 13 and 15 of the first processing example and the background processing is different, and thus only the background processing will be described.

Figure 16:
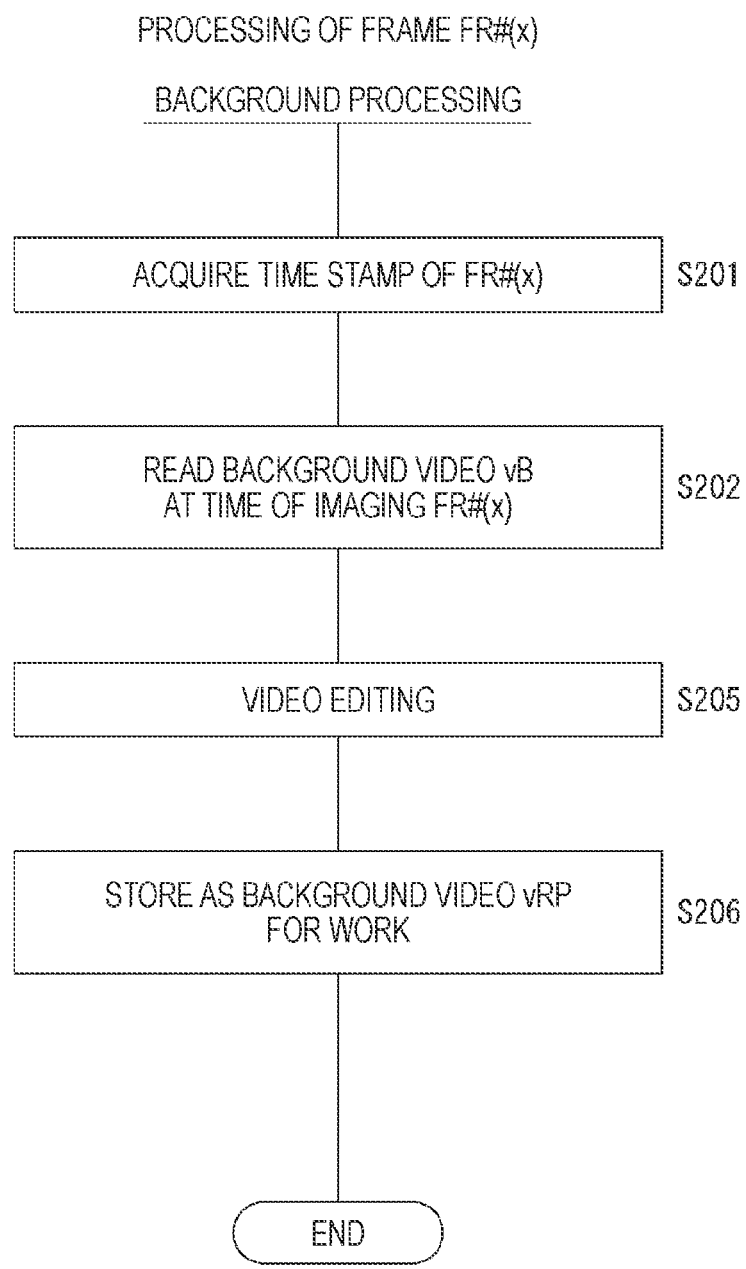
FIG. 16 is a flowchart of background processing of a second embodiment.

In the second processing example, the background processing is performed as illustrated in FIG. 16.

In step S201, the information processing device 70 acquires the time stamp of the frame #(x) to be processed in the captured video vC.

In step S202, the information processing device 70 reads the background video vB used at the time of imaging from the recording medium on the basis of the time stamp.

The above is similar to the first processing example.

In step S205, the information processing device 70 performs video editing processing. For example, for the video data in the range of the capturing region video vBC in the read background video vB, luminance and color correction processing, adjustment processing, processing of conversion to a high resolution by an interpolation technique or the like, noise reduction, and the like are performed. Moreover, special effects, addition of CG video, addition or deletion of a part of the subject, and the like may be performed.

Furthermore, in step S205, the influence of the lighting of the light 580 may be removed, or video processing reflecting the influence of new lighting may be performed. By performing these pieces of video processing, for example, the background video vRP having a quality suitable as a frame constituting a completed product of the video content is generated.

For example, it is also possible to perform video editing in which a change in a video due to a shadow of an object or the like, for example, a change in luminance or color is applied to the background video vRP.

In addition, it is also possible to perform video editing such that a change in brightness depending on the time zone set for the scene is expressed in the background video vRP.

Furthermore, in step S205, processing of changing the degree of blur on the video may be performed. For example, when the degree of blur intended by the staff is not obtained on the captured video vC, the background video vRP is generated by changing the degree of blur of all or a part of the background video vB.

Note that the blur amount in the captured video vC can be determined, for example, by including the focus information and the diaphragm information in the imaging information of the frame.

Frame rate conversion can also be performed. For example, in a case where the background video vB including the original capturing region video vBC is at a frame rate of imaging by the camera 502, that is, at a frame rate lower than the frame rate of the captured video vC, the background video vRP with a higher frame rate may be generated by frame interpolation or the like. For example, it is also possible to generate the background video vRP for the frame #(x) of the current captured video vC in a state where the background video vB of a plurality of preceding and succeeding frames is read on the basis of the time stamps and frame interpolation processing is performed to increase the frame rate in step S202.

After performing the video editing as described above, in step S206, the information processing device 70 stores the background video vRP generated through the video editing for use in the subsequent synthesis processing of FIG. 15.

Thus, the background processing for one frame of the captured video vC is terminated.

Such a second processing example is an example in which the background video vB used at the time of imaging is read, but the quality of the background video vB is improved by the editing processing to obtain the background video vRP.

In other words, this means that the captured video vC obtained using the relatively low quality background video vB at the time of imaging can be made to have sufficient quality as the video content of the finished product later.

Figure 17:
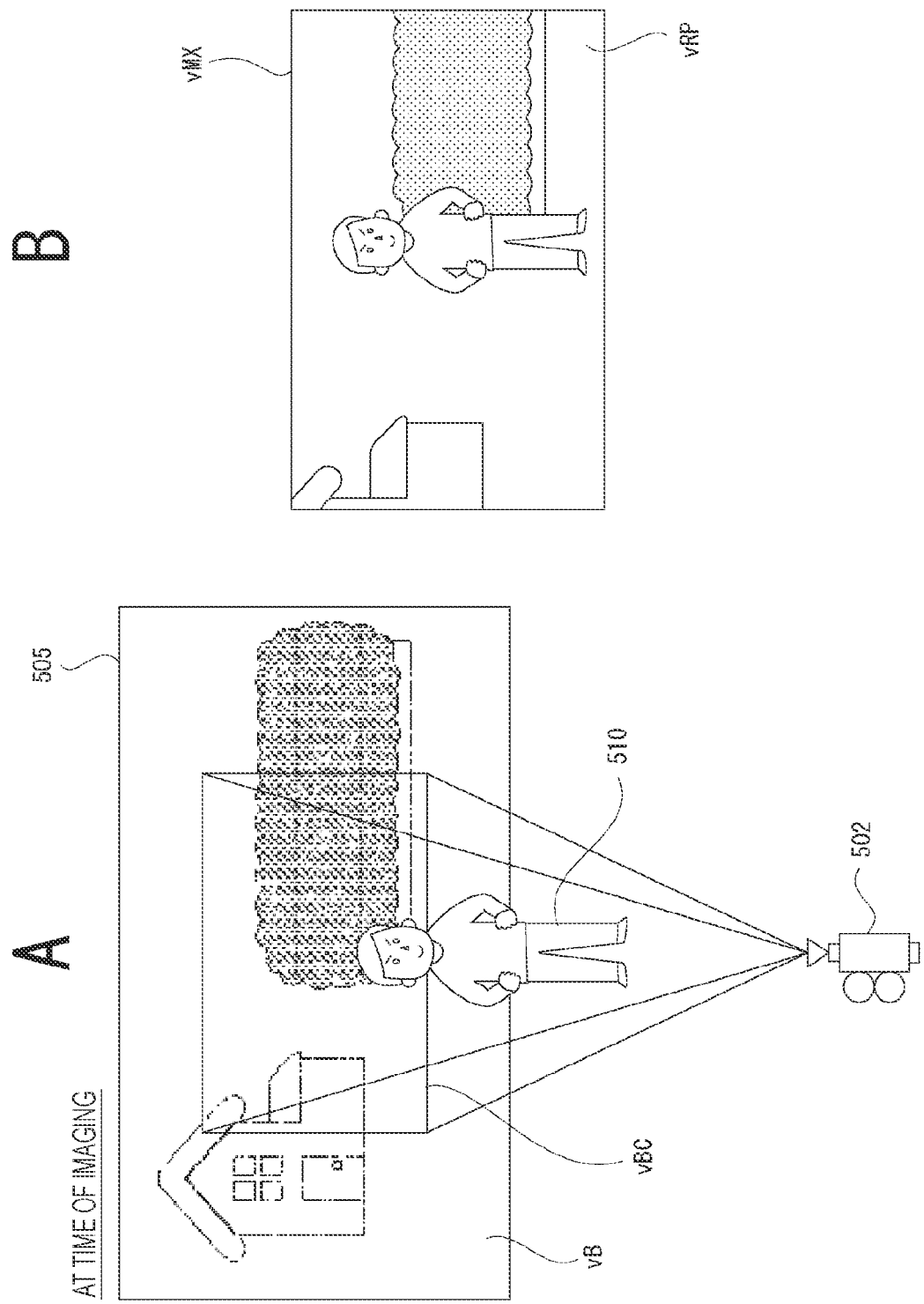
FIG. 17 is an explanatory diagram in a case where different background videos are used in the embodiment.

For example, it is assumed that the background video vB (at least the capturing region video vBC) used at the time of imaging in FIG. 17A is a low-resolution video. When the synthesized video vMX is generated by replacing with the background video vRP as illustrated in FIG. 17B, the resolution of the background video vRP is made higher than that of the capturing region video vBC. Alternatively, the frame rate is increased or lighting is reflected.

By these processes, not only the removal of the moire M and the like but also the effect of improving the quality of the video content can be obtained. In other words, even if the background video vB having relatively low quality is used at the time of imaging, it can be said that the quality of the final video content is not degraded.

Furthermore, for example, even if the background video vB has a high resolution as a whole, the resolution (the number of pixels) of the clipped background may be low in a case where the subject is imaged closely. Also in such a case, by increasing the resolution by the background video vRP, the quality of the final video content can be prevented from being degraded.

6. Third Processing Example

The background processing in the third processing example will be described with reference to FIG. 18.

In step S201, the information processing device 70 acquires the time stamp of the frame #(x) of the captured video vC.

In step S210, the information processing device 70 acquires the imaging information on the basis of the time stamp. As described above, the imaging information is information such as the position information, the imaging direction, and the angle of view of the camera 502.

As a premise of this processing example, when imaging is performed in the production ST2, the rendering engine 520 records the imaging information referred to in rendering the background video vB of each frame in association with the time stamp of the frame of the captured video vC corresponding to the background video vB. For example, the imaging information for each frame may be recorded in the asset server 530, or may be recorded on another recording medium (not illustrated). In any case, the imaging information is recorded in a state readable by the information processing device 70 that performs real-time processing at the time of imaging or the information processing device 70 used in the post-production ST3.

Alternatively, when the camera 502 records the captured video vC on the recording medium, the imaging information may be recorded as metadata for each frame in the captured video vC.

The imaging information as the metadata of a frame is the imaging information referred to by the rendering engine 520 at the timing of rendering the background video vB shown in the frame.

Thus, in step S210, the information processing device 70 can acquire the imaging information corresponding to the current frame FR #(x) to be processed. That is, it is the imaging information referred to at the time of rendering the background video vB displayed on the LED wall 505 at the time of imaging the frame of the captured video vC.

In step S211, the information processing device 70 acquires the second 3D background data. For example, the same 3D background data as the first 3D background data used at the time of imaging is read as the second 3D background data.

Note that the term "first 3D background data" is used to mean 3D background data used for real-time rendering at the time of imaging, and the term "second 3D background data" is used to mean 3D background data used for rendering at the time of background processing. The "first 3D background data" and the "second 3D background data" may be the same 3D background data, or may be different 3D background data.

First, a case where the "first 3D background data" and the "second 3D background data" are the same 3D background data will be described as an example.

For example, the ID of the 3D background data is managed in the asset server 530, and the ID is associated with each scene of the video content including the captured video vC.

The information processing device 70 determines the first 3D background data used to generate the background video vB at the time of imaging the currently processed frame FR #(x) to be processed by using the ID number corresponding to the scene of the video content in the frame FR #(x), or the like, and reads the first 3D background data from the DB such as the asset server 530 as the second 3D background data.

For this purpose, for example, it is sufficient if a scene number is managed for each frame of the captured video vC, or a background ID is attached to each frame.

Alternatively, table data that associates the ID of the 3D background data with each section by the time code of the frame may be stored.

In any case, for each frame of the captured video vC, it is sufficient if management that can specify the 3D background data used to generate the background video vB at the time of imaging each frame is performed. Accordingly, the information processing device 70 can automatically read the second 3D background data used for the frame FR #(x) to be processed.

Note that such a management format is an example. In addition to the background ID indicating the 3D background data being linked with the frame of the captured video vC, management may be performed such that each frame of the captured video vC is linked with the background video vB, and the background video vB is linked with the 3D background data with which the background video vB has been generated.

Furthermore, the information processing device 70 can analyze a video obtained by cutting out an object from the captured video in the process of the foreground processing as illustrated in FIG. 13, determine commonality between the video content serving as the background and the content of the background generated by the 3D model, and select and read 3D background data determined as common content.

Alternatively, the information processing device 70 can perform image analysis on the background video vB linked with the captured video vC, determine commonality between the video content serving as the background and the content of the background generated by the 3D model, and select and read 3D background data determined as common content.

Note that, for example, a staff member may manually select the second 3D background data to be read in step S211, and the information processing device 70 may read the second 3D background data from the asset server 530.

In step S212, the information processing device 70 performs rendering using the acquired second 3D background data and the imaging information. That is, the information processing device 70 specifies the viewpoint position with respect to the 3D background data on the basis of the position of the camera 502 at the time of imaging the frame FR #(x) to be processed, or the like, and generates the background video vRP as the video of the background viewed from the viewpoint.

For example, this means that the background video vRP is rendered under the same conditions using the same 3D background data as in the case of rendering the capturing region video vBC in the background video vB at the time of imaging.

However, in this case, various parameters specifying the rendering conditions may be different from those at the time of imaging.

Then, in step S213, the information processing device 70 stores the background video vRP by rendering for use in the subsequent synthesis processing in FIG. 15.

Thus, the background processing for one frame of the captured video vC is terminated.

As described above, in the third processing example, the background video vRP is generated by newly performing rendering on the basis of the imaging information at the time of imaging.

In terms of newly performing rendering, the following example is conceivable.

By performing rendering using the same 3D background data as that at the time of imaging and using the same imaging information, the same background video vRP as the capturing region video vBC in the background video vB is obtained. In a case where such a background video vRP is used, it is not necessary to store the background video vB (or the capturing region video vBC) including the capturing region video vBC as in the first processing example.

Furthermore, as described above, the same 3D background data is not necessarily used.

That is, 3D background data different from the first 3D background data used at the time of imaging may be read as the second 3D background data in step S211.

For example, in the asset creation ST1 up to the time of imaging, relatively simple 3D background data is generated. Then, 3D background data for obtaining a higher-definition video having the same background content is separately created using the time until the post-production ST3. Alternatively, the 3D background data used for imaging is updated to a 3D model capable of obtaining a higher-definition video by the time of the post-production ST3.

Such simple 3D background data is set as the first 3D background data, and high-definition 3D background data is set as the second 3D background data, which are managed in association with each other. For example, the second 3D background data is subjected to ID management as 3D background data for the same scene as the first 3D background data used at the time of imaging. Accordingly, in step S211 of FIG. 18, the information processing device 70 can acquire the high-definition second 3D background data.

Then, by performing rendering on the basis of the imaging information, the obtained background video vRP can be a high-definition video as compared with the capturing region video vBC having the same background content.

In a case where the high-definition 3D background data is created and stored in the asset server 530, the asset server 530 may analyze the background content thereof and compare it with the background content of the 3D background data managed so far, and automatically associate the background content.

Thus, it is possible to manage the simple 3D background data forming the background of the same scene and the high-definition 3D background data in association with each other.

Thus, when the information processing device 70 reads the 3D background data for the frame FR #(x) of the captured video vC in step S211, the high-definition second 3D background data associated with the simple first 3D background data can be automatically read.

Then, even in a case where the relatively low quality background video vB is used at the time of imaging, it is possible to obtain sufficient quality as the video content of the completed product by using the 3D background data with higher definition later, performing rendering again, and generating and replacing the background video vRP. Furthermore, such processing is suitable even in a case where there is a circumstance that it is desired to start the production ST2 early due to the schedule of video production.

As relatively simple 3D background data used at the time of imaging, it is assumed that the video change due to lighting is not reflected, and the 3D background data for rendering the background video vRP in the post-production ST3 may be separately created or updated as reflecting the video change due to lighting.

It is possible to obtain the synthesized video vMX in which the second 3D background data is in a state where the video change due to lighting, that is, the change in luminance or color as an influence on the video due to the presence or absence of lighting, the light amount, the irradiation direction, or the like is reflected.

7. Fourth Processing Example

The background processing in the fourth processing example will be described with reference to FIG. 19.

In step S201, the information processing device 70 acquires the time stamp of the frame #(x) of the captured video vC.

In step S210, the information processing device 70 acquires the imaging information on the basis of the time stamp.

In step S211, the information processing device 70 acquires the second 3D background data.

In step S212, the information processing device 70 performs rendering using the acquired second 3D background data and the imaging information.

The processing up to this point is similar to that of the third processing example.

In step S220, the information processing device 70 performs video editing on the rendered background video vRP. For example, the information processing device 70 performs luminance and color correction processing, adjustment processing, processing of conversion to a high resolution by an interpolation technique or the like, noise reduction, and the like on the background video vRP. Moreover, special effects, addition of CG video, addition or deletion of a part of the subject, and the like may be performed.

Furthermore, the influence of the lighting of the light 580 may be removed, or video processing reflecting the influence of new lighting may be performed.

Furthermore, the information processing device 70 may perform processing of changing the degree of blur on the video. For example, when the blur state intended by the staff is not obtained on the captured video vC, the blur state of all or a part of the background video vRP is changed. For example, when focus information (focal length) of the lens of the camera 502 at the time of imaging, diaphragm information, and the like are included as the imaging information, a blur effect and the like can be added to the background video vRP.

Furthermore, the background video vRP having a higher frame rate than that at the time of imaging may be generated. Note that the frame rate may be increased by frame interpolation processing in step S220, or rendering in step S212 may be performed at a high frame rate. For example, imaging information of frames in between is interpolated and generated from imaging information of preceding and subsequent frames, and rendering from the 3D background data is performed at a viewpoint position based on the interpolated imaging information. Thus, the background video vRP at the timing at which the background video vB does not exist can be obtained. For example, in a case where the frame rate of the background video vB including the capturing region video vBC is lower than the captured video vC, it is effective to generate the background video vRP including frame interpolation.

In step S213, the information processing device 70 stores the rendered and further video-edited background video vRP for use in the subsequent synthesis processing in FIG. 15.

Thus, the background processing for one frame of the captured video vC is terminated.

In the fourth processing example, it is assumed that the background video vRP newly obtained by performing rendering on the basis of the imaging information at the time of imaging is further edited and used for replacement.

In terms of newly performing rendering, as described in the third processing example, an example of using the second 3D background data that is the same as or different from the first 3D background data is assumed. By using different 3D background data, a high-quality background can be replaced.

Further, by performing the video editing processing, the background can be replaced with a background to which high quality or various video effects are added as described in the second processing example.

8. Application Example in Case of Using Plurality of Cameras

In the third and fourth processing examples, an example in which the background video vRP is newly rendered and generated has been described, but this idea can be used to apply to imaging with a plurality of cameras.

In movie imaging, several types of angle-of-view videos are captured by a plurality of cameras, and any cut is used at the time of editing.

As such imaging, for example, a case where imaging is performed by the cameras 502a and 502b as described with reference to FIG. 7 will be considered.

In the case of virtual production, the capturing region video vBC corresponding to each of the cameras 502a and 502b may be displayed. However, even in a case where the plurality of cameras 502 is used in order to avoid interference between the respective capturing region videos vBC, there is a case where the capturing region video vBC by one camera 502 is generated by real-time rendering and is reflected in the background video vB. For example, in the case of FIG. 7, for example, it is assumed that the capturing region video vBC corresponding to the camera 502a is displayed on the LED wall 505.

In this case, the background of the captured video vC captured by the camera 502b is not appropriate. This is because the capturing region video vBC corresponding to the camera 502b is not displayed on the LED wall 505.

However, a director or a staff sometimes wants to use a video of the performer 510 captured by the camera 502b in a certain scene. Therefore, it is desired to properly use the captured videos vC of the cameras 502a and 502b arbitrarily at a point of time after capturing.

Accordingly, when the replacement using the background video vRP is performed for the captured video vC in which the background video vB is imaged, the background video vRP can be set as the capturing region video vBC suitable for the camera 502b.

Figure 20:
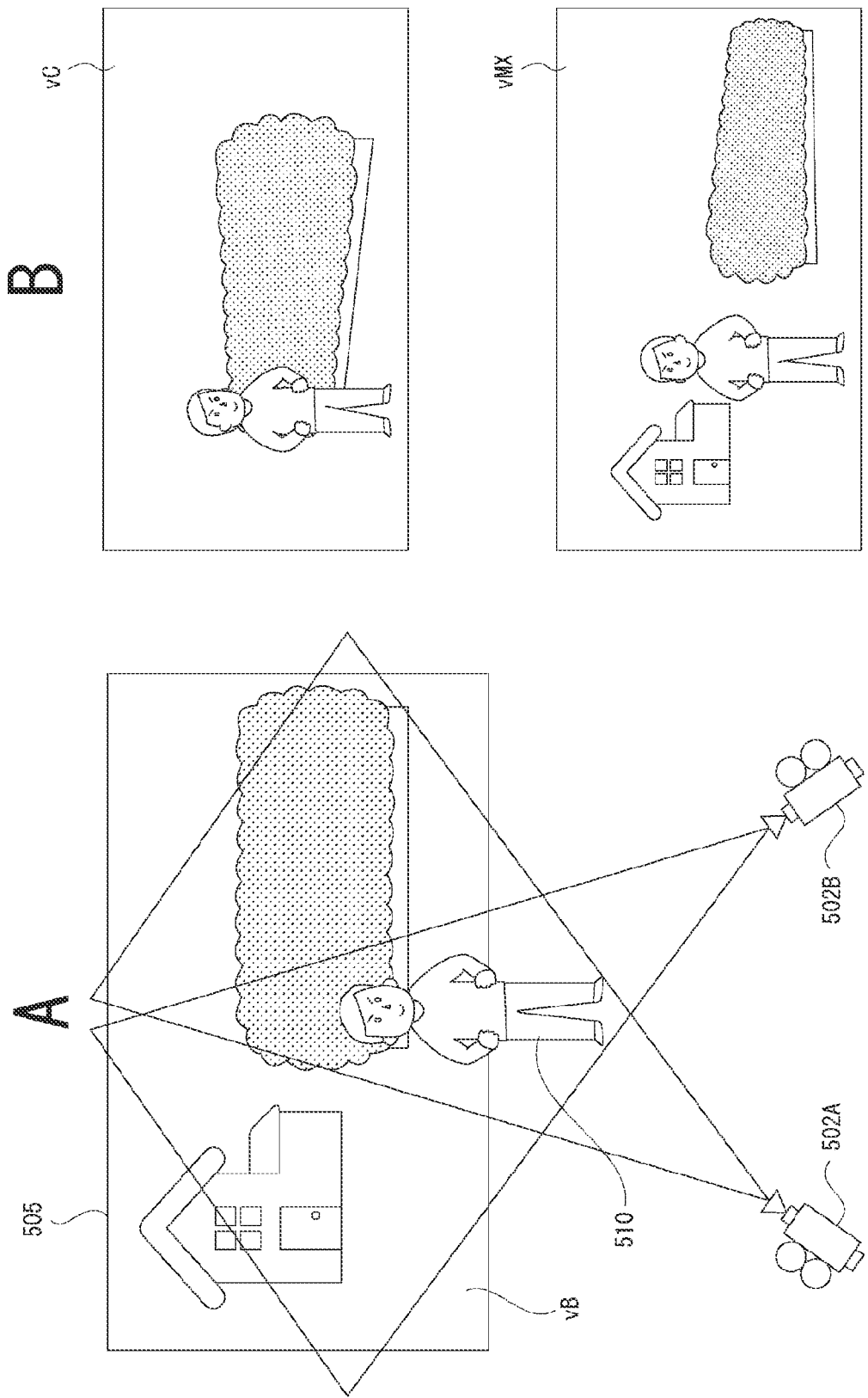
FIG. 20 is an explanatory diagram in a case where a plurality of cameras is used in the embodiment.

FIG. 20A illustrates a state in which the background video vB and the performer 510 on the LED wall 505 are captured by cameras 502a and 502b.

FIG. 20B illustrates a captured video vC captured by the camera 502a.

As can be seen from these drawings, the respective captured videos vC of the cameras 502a and 502b have different ranges seen as backgrounds. Furthermore, although not illustrated, since the background video vB includes the capturing region video vBC corresponding to the camera 502a, the background of the captured video vC captured by the camera 502b is not in an appropriate state.

Here, it is assumed that the director or the like wants to use the video of the performer 510 in the captured video vC captured by the camera 502b in the scene of interest in real time at the time of imaging in the production ST2 or at the stage of the post-production ST3.

In this case, as illustrated in FIG. 20C, a synthesized video vMX in which the performer 510 imaged by the camera 502b and the background rendered corresponding to the position and angle of view of the camera 502b are synthesized is generated.

Specifically, the imaging information is stored in association with a time stamp for each of the cameras 502a and 502b.

Figure 18:
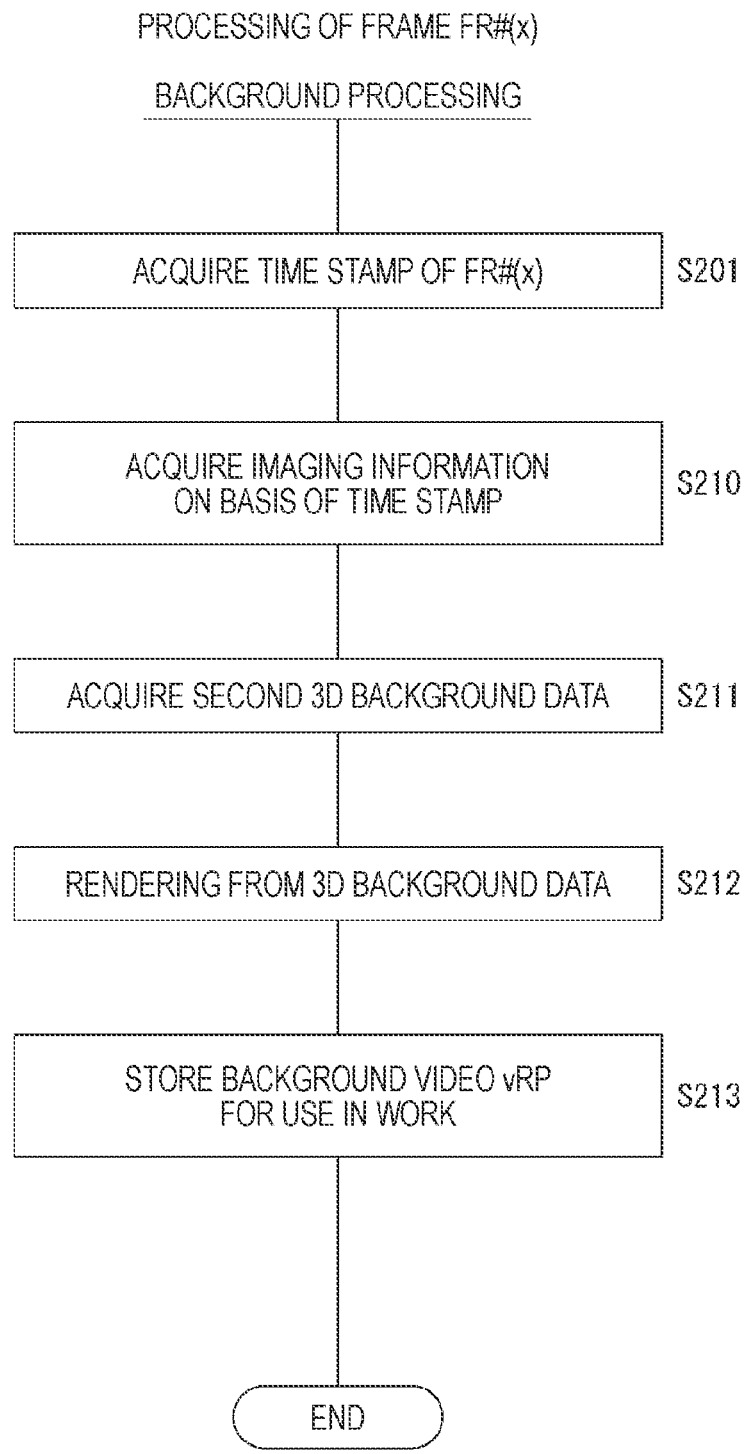
FIG. 18 is a flowchart of background processing of a third embodiment.
Figure 19:
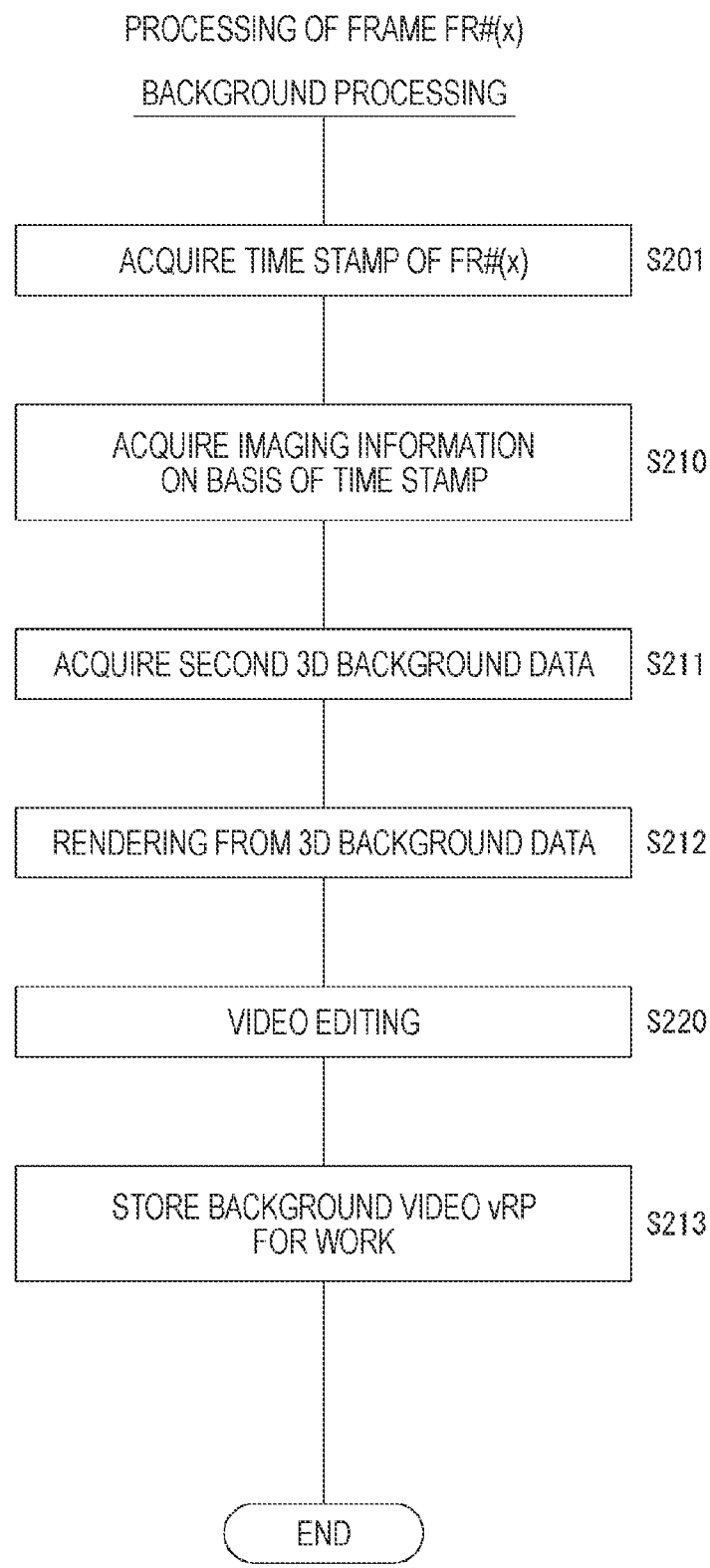
FIG. 19 is a flowchart of background processing of a fourth embodiment.

Then, in step S210 in FIG. 18 or 19, the imaging information of the camera 502b is acquired on the basis of the time stamp of the frame FR #(x).

Thus, since the rendering in step S212 can be executed on the basis of the imaging information of the camera 502b, the background video vRP as the capturing region video vBC from the viewpoint of the camera 502b can be obtained. Such a background video vRP is generated by background processing.

Furthermore, in the foreground processing of FIG. 13, the mask α is generated from the captured video vC of the camera 502b, and the foreground video vA is generated in advance.

Then, by using the foreground video vA, the mask α, and the background video vRP in the synthesis processing of FIG. 15, the synthesized video vMX as the imaging of the camera 502b as in FIG. 20C can be obtained.

In this manner, the technology of replacing the background for eliminating the artifact can also be applied to the switching of the cameras 502a and 502b in the post-production ST3.

Note that, in step S212 in FIG. 18 or 19, in a case where rendering is performed using the second 3D background data with reference to the imaging information of the camera 502b, the second 3D background data may be the same as the first 3D background data, or different 3D background data may be used.

9. Summary and Modification Example

According to the above embodiments, the following effects can be obtained.

The information processing device 70 of the embodiment includes the video processing unit 85 that generates a synthesized video vMX by synthesizing a foreground video vA that is an object video and a background video vRP (second video) obtained by rendering second 3D background data, the object video being cut out from a captured video vC obtained by imaging an object such as a performer 510 with the LED wall 505 as the background, the LED wall 505 displaying a background video vB including a capturing region video vBC (first video) obtained by rendering first 3D background data.

Note that the first and second 3D background data mentioned here may be the same 3D background data or may be different 3D background data as described in the first to fourth processing examples described above.

By capturing the background video vB displayed on the LED wall 505, artifacts such as moire M and a ghost GS occur in the captured video vC. Accordingly, a video of an object such as the performer 510, which is a foreground of the background video vB, is cut out and synthesized with the background video vRP that is not through capturing, for example. Thus, artifacts occurring in the background of the captured video vC can be eliminated. Therefore, the problem of the video produced as the virtual production can be solved, and the video production utilizing the advantage of the virtual production can be promoted.

In the first and second processing examples, an example has been described in which the first 3D background data described above and the second 3D background data are the same data.

It is assumed that the background video vB to be displayed on the LED wall 505 is generated by rendering certain 3D background data produced as a background asset, and the background video vRP used for the synthesis processing is also obtained by rendering the same 3D background data.

Thus, the background can be replaced without preparing the 3D background data separately from the 3D background data used for imaging, and the processing can be made efficient.

In the first processing example or the third processing example, an example of a case has been described in which the capturing region video vBC and the background video vRP are videos generated under the same condition on the basis of the same 3D background data.

In this case, as video data generated by rendering using certain 3D background data produced as a background asset, video data in which various conditions such as a viewpoint position, resolution, and various parameters of luminance processing and color processing with respect to the 3D background data are the same is set as the capturing region video vBC and the background video vRP.

For example, when the background video vB including the capturing region video vBC for imaging is generated, the background video vB (at least the range of the capturing region video vBC) may be stored and used as the background video vRP as it is (see the first processing example).

Thus, it is not necessary to newly generate the background video vRP, and the post-production for the synthesis processing can be made efficient.

Alternatively, various conditions at the time of generating the background video vB including the capturing region video vBC may be stored, and in the subsequent post-production, the background video vRP under the same conditions may be obtained by performing rendering again under the stored various conditions using the same 3D background data (see the third processing example). In this case, conditions for rendering may be stored.

In the second and fourth processing examples, an example has been described in which the background video vRP is a video having a blur amount different from that of the capturing region video vBC.

For example, even if the background video vB including the capturing region video vBC displayed on the LED wall 505 is different from the blur amount intended by the director or the staff, the background video vRP used for the synthesis processing is set to the original blur amount by the video editing. Thus, the background of the originally intended blur amount can be achieved in the synthesized video vMX.

For example, in step S205 of FIG. 16, step S220 of FIG. 19, or the like, the background video vRP can be generated by performing video editing for changing the blur amount.

In the second and fourth processing examples, an example has been described in which the background video vRP is a video having a higher resolution as compared to the capturing region video vBC.

In other words, it is assumed that the background video vB including the capturing region video vBC to be displayed on the LED wall 505 is produced with low resolution.

By setting the background video vB to a relatively low-resolution video, a processing load of real-time rendering of the capturing region video vBC according to the position of the camera 502 or the like is reduced. Even in a relatively low-resolution video, the performer 510 and the staff can recognize the background, so that there is not much trouble in imaging. In addition, preparation of the 3D background data can be simplified, and it is also suitable for shortening the time of asset creation.

Then, even if the background video vB including the capturing region video vBC has a low resolution, the background video vRP to be reflected in the synthesis processing has a high resolution, so that sufficient quality can be obtained as a video of a completed product.

Therefore, it is effective for video production to use a low-resolution video as the simple background video vB for imaging and to use a high-resolution video as the background video vRP for the synthesis processing.

Obtaining the background video vRP with high resolution can be achieved by, for example, performing resolution enhancement processing in step S205 of FIG. 16 or step S220 of FIG. 19, or generating high-definition video data in rendering processing for the background video vRP in step S212 of FIGS. 18 and 19, or the like.

In the second and fourth processing examples, an example has been described in which the background video vRP is a video having a higher frame rate as compared to the capturing region video vBC.

In other words, the background video vB displayed on the LED wall 505 is produced at a low frame rate.

By setting the background video vB to a video of a relatively low frame rate, a processing load of real-time rendering of the capturing region video vBC according to the position of the camera 502 or the like is reduced. Since the performer 510 and the staff can recognize the background even in the video of a relatively low frame rate, there is no problem in imaging. In addition, preparation of the 3D background data can be simplified, and it is also suitable for shortening the time of asset creation.

Even when the background video vB including the capturing region video vBC is set to a low frame rate, the background video vRP to be reflected in the synthesis processing is set to a high frame rate, so that sufficient quality as a video of a completed product can be obtained.

Therefore, it is effective for video production to use a low-frame-rate video as the simple background video vB for imaging and to use a high-frame-rate video as the background video vRP for the synthesis processing.

Obtaining the background video vRP with a high frame rate can be achieved by, for example, performing frame rate conversion processing in step S205 of FIG. 16 or step S220 of FIG. 19, or generating video data with a high frame rate in rendering processing for the background video vRP in step S212 of FIGS. 18 and 19, or the like. Therefore, also in the third processing example of FIG. 18, the background video vRP can be set to a video of a high frame rate.

In the third and fourth processing examples, an example in which the first 3D background data and the second 3D background data are different data has been described.

It is assumed that the background video vB including the capturing region video vBC to be displayed on the LED wall 505 is generated by rendering certain 3D background data produced as a background asset, and the background video vRP used for the synthesis processing is obtained by rendering different 3D background data.

Examples of the mutually different 3D background data here include first 3D background data created simply as a 3D model and second 3D background data created as a high-definition 3D model, which have the same background content.

If too much time is used for the asset creation ST1, the schedule of the production ST2 (imaging) may be disturbed. For this reason, it is often impossible to secure sufficient time for the asset creation ST1. Accordingly, it is preferable that it is possible to create the 3D background data in a relatively simple manner in a short time and then perform imaging.

On the other hand, the quality of the video content to be produced can be maintained by generating the background video vRP using the high-definition 3D background data created up to the stage of the post-production ST3.

Therefore, it is effective for video production to create high-definition 3D background data for obtaining the background video vRP used for the synthesis processing while creating simple 3D background data for the background video vB used for imaging.

As an example of the case of using different 3D background data, it can be achieved by acquiring high-definition 3D background data different from that at the time of imaging and performing rendering in step S211 in FIGS. 18 and 19.

In the third and fourth processing examples, an example in which the second 3D background data is data updated on the basis of the first 3D background data has been described.

By using the updated second 3D background data that forms the same background on the basis of the first 3D background data, the synthesis processing can be performed using the background video vRP having higher definition than that at the time of imaging.

In the third and fourth processing examples, an example has been described in which the first 3D background data is data in which a video change due to lighting is not reflected, and the second 3D background data is data in which a video change due to lighting is reflected.

By setting the second 3D background data to data reflecting a video change due to lighting, it is possible to obtain the synthesized video vMX reflecting a change in a video state due to lighting, for example, a change in luminance or color.

In other words, simple 3D background data that does not reflect lighting can be used at the time of imaging.

In the third and fourth processing examples, an example has been described in which the first 3D background data and the second 3D background data are data created independently of each other as a background video having the same content.

For example, the first 3D background data is a simply created 3D model, and the second 3D background data is a high-definition 3D model.

The first 3D background data to be used at the time of imaging and the second 3D background data to be used at the time of synthesis have the same background content but are separately produced. Background production suitable for each of imaging and synthesis can be performed.

In the third and fourth processing examples, an example has been described in which the background video vRP is generated by rendering the second 3D background data on the basis of imaging information at the time of imaging.

The background video vRP is rendered and generated using the second 3D background data (see FIGS. 18 and 19). In this case, the same background as the state of the foreground video VA to be synthesized at the time of imaging can be obtained by being on the basis of the imaging information such as the position of the camera 502.

Note that both cases where the second 3D background data at the time of rendering to obtain the background video vRP is the same data as the first 3D background data and where they are different data are assumed.

In the embodiment, an example in which the imaging information includes camera position information at the time of imaging has been described.

The presence of the position information of the camera 502 for each frame allows rendering to be performed using the second 3D background data as a viewpoint from the position. Thus, the background video vRP can be a video from the same viewpoint as the capturing region video vBC.

In the embodiment, an example has been described in which the imaging information includes a camera direction, an angle of view, a focal length, an F value (aperture value), a shutter speed, lens information, and the like at the time of imaging. All or only a part of them may be included.

By including these pieces of information as the information of the camera 502 for each frame, it is possible to perform rendering under the same conditions as those at the time of imaging.

In the third and fourth processing examples, it has been described that the video processing unit 85 extracts the second 3D background data from the asset server 530, which is a DB that manages the 3D background data group according to the time stamp and the image analysis (see step S211 in FIGS. 18 and 19).

For example, the second 3D background data is extracted from the asset server 530 that manages a 3D background data group on the basis of the background video vB (capturing region video vBC), or the captured video vC, or a video obtained by cutting out an object from the captured video vC.

When the background video vRP is rendered and generated using the second 3D background data, the second 3D background data can be acquired from, for example, the asset server 530. In this case, the information processing device 70 automatically extracts the second 3D background data, so that the post-production ST3 can be made efficient.

Note that the information processing device 70 can extract the second 3D background data for obtaining the video of the similar background by being on the basis of the background video vB (capturing region video vBC), or the captured video vC, or the video after cutting out the foreground video vA from the captured video vC.

In the third and fourth processing examples, an example has been described in which the second 3D background data managed in association with the first 3D background data in the DB is extracted from the information of the first 3D background data with which the background video vB has been generated.

For example, the second background data associated in the DB is extracted from the image recognition or the management ID or the like of the first 3D background data for which the background video vB is generated.

Thus, the second 3D background data can be automatically extracted to generate the background video vRP. Then, the background replacement processing can be performed automatically or semi-automatically, and man-hour reduction and time reduction of the post-production ST3 can be promoted.

In the third and fourth processing examples, an example has been described in which, the synthesized video vMX is generated by synthesizing the background video vRP obtained by rendering using the imaging information at the time of imaging with respect to the second 3D background data extracted from the DB and the object video cut out from the captured video vC.

In a case where the second 3D background data is extracted from the DB, the processing of generating the background video vRP by performing rendering using the imaging information and synthesizing the background video vRP is automated, whereby the synthesis processing is made efficient. This can also promote man-hour reduction and time reduction in the post-production ST3.

In the embodiment, an application example in a case where images are captured by the plurality of cameras 502a and 502b has also been described.

In a case where imaging is performed by the plurality of cameras 502a and 502b, there is a case where it is desired to employ the video of the performer 510 by the angle of view of the camera 502b different from the camera 502a that generates the background video vB including the capturing region video vBC according to the camera position or the like at the time of imaging.

In this case, if the background video vRP is prepared similarly to the background video vB, the background of the synthesized video vMX does not match the performer 510. Accordingly, the background video vRP obtained by rendering the second 3D background data is generated using the imaging information at the time of imaging by the camera 502b. By generating the synthesized video vMX using this, the synthesized video vMX can be a background video adapted to the angle of view by the camera 502.

Therefore, not only the captured video vC of the main camera 502a in which the angle of view is reflected on the LED wall 505 at the time of imaging, but also the captured video of the performer 510 and the like by the camera 502b in which the angle of view is not reflected on the LED wall 505 at the time of imaging can be employed as the video of the finished product.

In the embodiment, an example has been described in which the capturing region video vBC (first video) and the background video vRP (second video) are videos obtained by rendering at the same viewpoint or different viewpoints on the basis of the same 3D background data. For example, from the viewpoint of artifact removal, the background video vB and the background video vRP are only required to be videos obtained by rendering at the same viewpoint on the basis of the same 3D background data.

On the other hand, in the case of using the videos of the plurality of cameras 502 as described above, the background video vB and the background video vRP are videos obtained by rendering at different viewpoints on the basis of the same 3D background data.

The program of the embodiment is, for example, a program for causing a processor such as a CPU or a DSP, or a device including the processor to execute the processing of the video processing unit 85 described above.

That is, the program of the embodiment is a program for causing an information processing device to execute video processing of generating a synthesized video vMX by synthesizing an object video and a background video vRP obtained by rendering second 3D background data, the object video being cut out from a captured video vC obtained by imaging an object with a display device as a background, the display device displaying a capturing region video vBC obtained by rendering first 3D background data.

With such a program, the information processing device 70 that can be used for the production ST2 and the post-production ST3 described above can be implemented by various computer devices.

Such a program can be recorded in advance in an HDD as a recording medium built in a device such as a computer device, a ROM in a microcomputer having a CPU, or the like. Furthermore, such a program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as what is called package software.

Furthermore, such a program can be installed from the removable recording medium into a personal computer or the like, or can be downloaded from a download site via a network such as a local area network (LAN) or the Internet.

Furthermore, such a program is suitable for providing the information processing device 70 of the embodiment in a wide range. For example, by downloading the program to a personal computer, a communication device, a portable terminal device such as a smartphone or a tablet, a mobile phone, a game device, a video device, a personal digital assistant (PDA), or the like, these devices can be caused to function as the information processing device 70 of the present disclosure.

Note that the effects described in the present specification are merely examples and are not limited, and other effects may be provided.

Note that the present technology can also have the following configurations.

(1)
An information processing device, including:
a video processing unit that generates a synthesized video by synthesizing an object video and a second video obtained by rendering second 3D background data, the object video being cut out from a captured video obtained by imaging an object with a display device as a background, the display device displaying a first video obtained by rendering first 3D background data.

(2)
The information processing device according to (1) above, in which
the first 3D background data and the second 3D background data are same data.

(3)
The information processing device according to (1) or (2) above, in which
the first video and the second video are videos generated under a same condition on the basis of same 3D background data.

(4)
The information processing device according to (1) or (2) above, in which
the second video is a video having a blur amount different from a blur amount of the first video.

(5)
The information processing device according to any one of (1), (2), and (4) above, in which
the second video is a video having a higher resolution as compared to the first video.

(6)
The information processing device according to any one of (1), (2), (4), and (5) above, in which
the second video is a video having a higher frame rate as compared to the first video.

(7)
The information processing device according to (1) above, in which
the first 3D background data and the second 3D background data are different data.

(8)
The information processing device according to (1) or (7) above, in which
the second 3D background data is data updated on the basis of the first 3D background data.

(9)
The information processing device according to any one of (1), (7), and (8) above, in which
the first 3D background data is data in which a video change due to lighting is not reflected, and the second 3D background data is data in which a video change due to lighting is reflected.

(10)
The information processing device according to (1) or (7) above, in which
the first 3D background data and the second 3D background data are data created independently of each other as a background video having same content.

(11)
The information processing device according to any one of (1) to (10) above, in which
the second video is generated by rendering the second 3D background data on the basis of imaging information at time of imaging.

(12)
The information processing device according to (11) above, in which
the imaging information includes camera position information at time of imaging.

(13)
The information processing device according to (11) or (12) above, in which
the imaging information includes any one of a camera direction, an angle of view, a focal length, an F value, a shutter speed, and lens information at time of imaging.

(14)
The information processing device according to any one of (1) to (13) above, in which
the video processing unit
extracts the second 3D background data from a database that manages a 3D background data group on the basis of the first video, or the captured video, or a video obtained by cutting out an object from the captured video, and generates the synthesized video by synthesizing the second video obtained by rendering the second 3D background data on the basis of imaging information at time of imaging and the object video cut out from the captured video.

(15)
The information processing device according to (14) above, in which
the video processing unit
extracts the second 3D background data managed in the database in association with the first 3D background data from information of the first 3D background data with which the first video has been generated.

(16)
The information processing device according to (14) or (15) above, in which
the video processing unit
generates the synthesized video by synthesizing the second video obtained by rendering using the imaging information at time of imaging with respect to the second 3D background data extracted from the database and the object video cut out from the captured video.

(17)
The information processing device according to (1) to (16) above, in which
in a case where an object is imaged by a plurality of cameras with the display device as a background, and a case where the display device is caused to display the first video obtained by rendering the first 3D background data on the basis of position information of a first camera, and an object is imaged by the first camera to generate a captured video,
the video processing unit
generates second content by synthesizing an object video cut out from a captured video of a second camera obtained by imaging an object with the display device as a background, and the second video obtained by rendering the second 3D background data by using imaging information at time of imaging of the second camera.

(18)
The information processing device according to (1) to (17) above, in which
the first video and the second video are videos obtained by rendering at a same viewpoint or different viewpoints on the basis of same 3D background data.

(19)
A video processing method including:
generating a synthesized video by synthesizing an object video and a second video obtained by rendering second 3D background data, the object video being cut out from a captured video obtained by imaging an object with a display device as a background, the display device displaying a first video obtained by rendering first 3D background data.

(20)
A program for causing an information processing device to execute:
video processing of generating a synthesized video by synthesizing an object video and a second video obtained by rendering second 3D background data, the object video being cut out from a captured video obtained by imaging an object with a display device as a background, the display device displaying a first video obtained by rendering first 3D background data.

REFERENCE SIGNS LIST

70 Information processing device
71 CPU
85 Video processing unit
500 Imaging system
501 Performance area
502, 502a, 502b Camera
503 Output monitor
505 LED wall
506 LED panel
520 Rendering engine
530 Asset server
540 Sync generator
550 Operation monitor
570 LED processor
580 Light
581 Lighting controller
590 Display controller
vB Background video
vBC Capturing region video
vC Captured video
vM Monitor video
vRP Background video (background video for replacement)
vA Foreground video
vMX Synthesized video
vOP Operation image

The invention claimed is:

1. An information processing device, comprising:
circuitry configured to generate a synthesized video by synthesizing
an object video, and
a second video obtained by rendering second 3D background data,
wherein the object video is cut out from a captured video obtained by imaging an object with a display device as a background, and
wherein the display device is controlled to display a first video obtained by rendering first 3D background data.

2. The information processing device according to claim 1,
wherein the first 3D background data and the second 3D background data are generated based on same data.

3. The information processing device according to claim 1,
wherein the first video and the second video are videos generated under a same condition based on same 3D background data.

4. The information processing device according to claim 1,
wherein the second video is a video having a blur amount different from a blur amount of the first video.

5. The information processing device according to claim 1,
wherein the second video is a video having a higher resolution as compared to the first video.

6. The information processing device according to claim 1,
wherein the second video is a video having a higher frame rate as compared to the first video.

7. The information processing device according to claim 1,
wherein the first 3D background data and the second 3D background data are different data.

8. The information processing device according to claim 1,
wherein the second 3D background data is data updated based on the first 3D background data.

9. The information processing device according to claim 1,
wherein the first 3D background data is data in which a video change due to lighting is not reflected, and
wherein the second 3D background data is data in which a video change due to lighting is reflected.

10. The information processing device according to claim 1,
wherein the first 3D background data and the second 3D background data are data created independently of each other as a background video having same content.

11. The information processing device according to claim 1,
wherein the second video is generated by rendering the second 3D background data based on imaging information at a time of imaging.

12. The information processing device according to claim 11,
wherein the imaging information includes camera position information at the time of imaging.

13. The information processing device according to claim 11,
wherein the imaging information includes at least one of a camera direction, an angle of view, a focal length, an F value, a shutter speed, or lens information at the time of imaging.

14. The information processing device according to claim 1,
wherein the circuitry is further configured to
extract the second 3D background data from a database that manages a 3D background data group based on the first video, or the captured video, or a video obtained by cutting out an object from the captured video, and
generate the synthesized video by synthesizing the second video obtained by rendering the second 3D background data based on imaging information at a time of imaging and the object video cut out from the captured video.

15. The information processing device according to claim 14,
wherein the circuitry extracts the second 3D background data managed in the database in association with the first 3D background data from information of the first 3D background data with which the first video has been generated.

16. The information processing device according to claim 14,
wherein the circuitry generates the synthesized video by synthesizing the second video obtained by rendering using the imaging information at the time of imaging with respect to the second 3D background data extracted from the database and the object video cut out from the captured video.

17. The information processing device according to claim 1,
wherein in a case where an object is imaged by a plurality of cameras with the display device as a background,
wherein the display device is caused to display the first video obtained by rendering the first 3D background data based on position information of a first camera and an object is imaged by the first camera to generate captured video, and
wherein the circuitry is further configured to generate second content by synthesizing
a second object video cut out from a captured video of a second camera obtained by imaging a second object with the display device as a background, and
the second video obtained by rendering the second 3D background data by using imaging information at a time of imaging of the second camera.

18. The information processing device according to claim 1,
wherein the first video and the second video are videos obtained by rendering at a same viewpoint or different viewpoints based on same 3D background data.

19. A video processing method comprising:
generating a synthesized video by synthesizing
an object video, and
a second video obtained by rendering second 3D background data,
wherein the object video is cut out from a captured video obtained by imaging an object with a display device as a background, and
wherein the display device is controlled to display a first video obtained by rendering first 3D background data.

20. A non-transitory computer-readable storage medium having embodied thereon a program, which when executed by a computer causes the computer to execute a method, the method comprising:
generating a synthesized video by synthesizing
an object video, and
a second video obtained by rendering second 3D background data,
wherein the object video is cut out from a captured video obtained by imaging an object with a display device as a background, and
wherein the display device is controlled to display a first video obtained by rendering first 3D background data.

* * * * *